US012776931B2

(12) United States Patent
Albert et al.

(10) Patent No.: US 12,776,931 B2
(45) Date of Patent: Oct. 27, 2026

(54) LOW COMPLEXITY ML AUGMENTED ROBUST CHANNEL ESTIMATION

(71) Applicant: Samsung Electronics Co., Ltd., Suwon-si (KR)

(72) Inventors: Samuel Albert, Robbinsville, NJ (US); Thuy Van Nguyen, Plano, TX (US); Yeqing Hu, Allen, TX (US); Yang Li, Plano, TX (US); Yan Xin, Princeton, NJ (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 18/930,930

(22) Filed: Oct. 29, 2024

(65) Prior Publication Data

US 2025/0158850 A1 May 15, 2025

Related U.S. Application Data

(60) Provisional application No. 63/598,032, filed on Nov. 10, 2023.

(51) Int. Cl.
*H04L 25/02* (2006.01)
*H04B 17/336* (2015.01)

(52) U.S. Cl.
CPC ......... *H04L 25/021* (2013.01); *H04B 17/336* (2015.01); *H04L 25/0242* (2013.01)

(58) Field of Classification Search
CPC .. H04L 25/0242; H04L 25/021; H04B 17/336
(Continued)

(56) References Cited

U.S. PATENT DOCUMENTS

| | | | |
|---|---|---|---|
| 10,560,221 B2 | 2/2020 | Saber et al. | |
| 2017/0295510 A1* | 10/2017 | Sharma | H04J 11/005 |

(Continued)

FOREIGN PATENT DOCUMENTS

| | | |
|---|---|---|
| CN | 111432429 B | 7/2021 |
| CN | 113748614 B | 6/2023 |

(Continued)

OTHER PUBLICATIONS

Larsson, E.G. et al., "Massive MIMO for next generation wireless systems," IEEE Communications Magazine, vol. 52, No. 2, pp. 186-195, Feb. 2014, 20 pages.

(Continued)

*Primary Examiner* — Leila Malek

(57) ABSTRACT

A method includes acquiring, by a processor of an electronic device, information associated with channel and noise covariances. The method includes determining one or more time-domain rectangular filters based on the information associated with the channel and noise covariances. The method includes generating one or more convolutional kernels based on the one or more rectangular filters applied to the channel and noise covariances in a time-domain. The method includes generating a codebook based on the one or more convolutional kernels, the codebook comprising N codewords. Further, the method can include establishing a communication link to a gNB configured to: receive a reference signal from a user equipment; receive the codebook; calculate channel statistics using a low complexity algorithm; execute a decision tree classifier to select a codeword from the codebook stored in memory of the gNB; and apply the selected codeword as convolution kernel for channel estimation.

20 Claims, 15 Drawing Sheets

(58) Field of Classification Search
USPC .......................................................... 375/227
See application file for complete search history.

(56) References Cited

U.S. PATENT DOCUMENTS

| | | | |
|---|---|---|---|
| 2023/0388158 | A1 | 11/2023 | Hu et al. |
| 2024/0056138 | A1 | 2/2024 | Hu et al. |

FOREIGN PATENT DOCUMENTS

| | | | |
|---|---|---|---|
| KR | 20180087563 | A | 8/2018 |
| KR | 20240074753 | A | 5/2024 |

OTHER PUBLICATIONS

Rusek, F. et al., "Scaling up MIMO: Opportunities and challenges with very large arrays," IEEE Signal Processing Magazine, vol. 30, No. 1, pp. 40-60, Dec. 2012, 30 pages.

Araujo, D.C. et al., "Channel estimation for millimeter-wave very-large MIMO systems," 2014 22nd European Signal Processing Conference (EUSIPCO), Sep. 2014, pp. 81-85, 5 pages.

Liu, Y. et al., "Channel estimation for OFDM," IEEE Communications Surveys and Tutorials, vol. 16, No. 4, pp. 1891-1908, May 2014, 18 pages.

Cheng, X. et al., "A ResNet-DNN based channel estimation and equalization scheme in FBMC/OQAM systems," 10th International Conference on Wireless Communications and Signal Processing (WCSP), Oct. 2018, pp. 1-5, 5 pages.

"SciML: Open source software for scientific machine learning." 2022, URL: https://sciml.ai, 8 pages.

Neumann, D. et al., "Learning the MMSE channel estimator," IEEE Transactions on Signal Processing, vol. 66, No. 11, pp. 2905-2917, Jan. 2018, 14 pages.

Tian, X. et al., "Machine learning-assisted codebook design for MMSE channel estimation," 2023 IEEE International Conference on Communications (ICC), May 2023, pp. 1-6, 6 pages.

Srivastava, V. et al., "Robust MMSE channel estimation in OFDM systems with practical timing synchronization," 2004 IEEE Wireless Communications and Networking Conference, vol. 2, Mar. 2004, pp. 711-716, 6 pages.

* cited by examiner

Simulation summary for TDLA channel

LOW COMPLEXITY ML AUGMENTED ROBUST CHANNEL ESTIMATION

CROSS-REFERENCE TO RELATED APPLICATION(S) AND CLAIM OF PRIORITY

This application claims priority under 35 U.S.C. § 119(e) to U.S. Provisional Patent Application No. 63/598,032 filed on Nov. 10, 2023. The above-identified provisional patent application is hereby incorporated by reference in its entirety.

TECHNICAL FIELD

This disclosure relates generally to wireless communication systems. More specifically, this disclosure relates to low-complexity machine-learning augmented robust channel estimation.

BACKGROUND

Low complexity channel estimation is critical for wireless systems, especially in next-generation high-speed wireless networks, such as massive multiple input multiple output (MIMO) networks or millimeter-wave (mmWave) networks. Many channel estimation algorithms have been proposed with different complexity and correspondingly different performance. For example, high complexity channel estimation algorithms use machine learning models, such as a fusion model. Specialty hardware is needed to execute a machine learning model (such as a fusion model) for high complexity channel estimation. An example of this specialty hardware is a graphics processing unit (GPU) that includes the computing resources that are not found in existing base stations for cellular communications. Within an existing base station, the computing resources and architecture include one or more computing processors that are generally not sufficient to execute a fusion model or other high complexity machine learning models, and that exclude GPUs. As a result, the computing resources and hardware architecture of existing base stations perform low complexity channel estimation using a moving average calculation.

The moving average calculation performed by an existing base station is associated with a couple of performance problems. First, the statistics are not known for an uplink channel from a user equipment (UE) to an existing base station. The statistics of the uplink channel are represented by large matrices. The channel statistics represent the location of the UE relative to the base station, and properties of the space between them. Second, the current hardware of existing bases stations cannot perform fast numerical algorithms to solve this optimization problem explicitly, such as a fast inversion of large matrices.

SUMMARY

This disclosure provides low-complexity machine-learning augmented robust channel estimation.

In a first embodiment, a method for designing a codebook of convolution kernels based on a time domain rectangular filter and training a decision tree classifier to select a codeword for real time channel estimation is provided. The method includes acquiring, by a processor of an electronic device, information associated with channel and noise covariances. The method includes determining one or more time-domain rectangular filters based on the information associated with the channel and noise covariances. The method includes generating one or more convolutional kernels based on the one or more rectangular filters applied to the channel and noise covariances in a time-domain. The method includes generating a codebook based on the one or more convolutional kernels, the codebook comprising N codewords.

In a second embodiment, an electronic device for designing a codebook of convolution kernels based on a time domain rectangular filter and training a decision tree classifier to select a codeword for real time channel estimation is provided. The electronic device includes a processor that is configured to acquire information associated with channel and noise covariances. The processor is configured to determine one or more time-domain rectangular filters based on the information associated with the channel and noise covariances. The processor is configured to generate one or more convolutional kernels based on the one or more rectangular filters applied to the channel and noise covariances in a time-domain. The processor is configured to generate a codebook based on the one or more convolutional kernels, the codebook comprising N codewords.

In a third embodiment a system for designing a codebook of convolution kernels based on a time domain rectangular filter and training a decision tree classifier to select a codeword for real time channel estimation is provided. The system includes the electronic device of the second embodiment and a base operably coupled to the electronic device. The base station includes a transceiver, a memory, and at least one processor. The transceiver of the base station is configured to receive a reference signal from a user equipment (UE). The at least one processor of the base station is configured to receive, from the electronic device, the codebook comprising N codewords. The at least one processor of the base station is configured to calculate channel statistics using a low complexity algorithm. The at least one processor of the base station is configured to execute a decision tree classifier to select a codeword from the codebook stored in the memory. The at least one processor of the base station is configured to apply the selected codeword as a convolution kernel for channel estimation.

In a fourth embodiment, a non-transitory computer readable medium comprising program code for designing a codebook of convolution kernels based on a time domain rectangular filter and training a decision tree classifier to select a codeword for real time channel estimation is provided. The computer program includes computer readable program code that, when executed by a processor of an electronic device, causes the processor to acquire information associated with channel and noise covariances. The computer readable program code causes the processor to determine one or more time-domain rectangular filters based on the information associated with the channel and noise covariances. The computer readable program code causes the processor to generate one or more convolutional kernels based on the one or more rectangular filters applied to the channel and noise covariances in a time-domain. The computer readable program code causes the processor to generate a codebook based on the one or more convolutional kernels, the codebook comprising N codewords.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
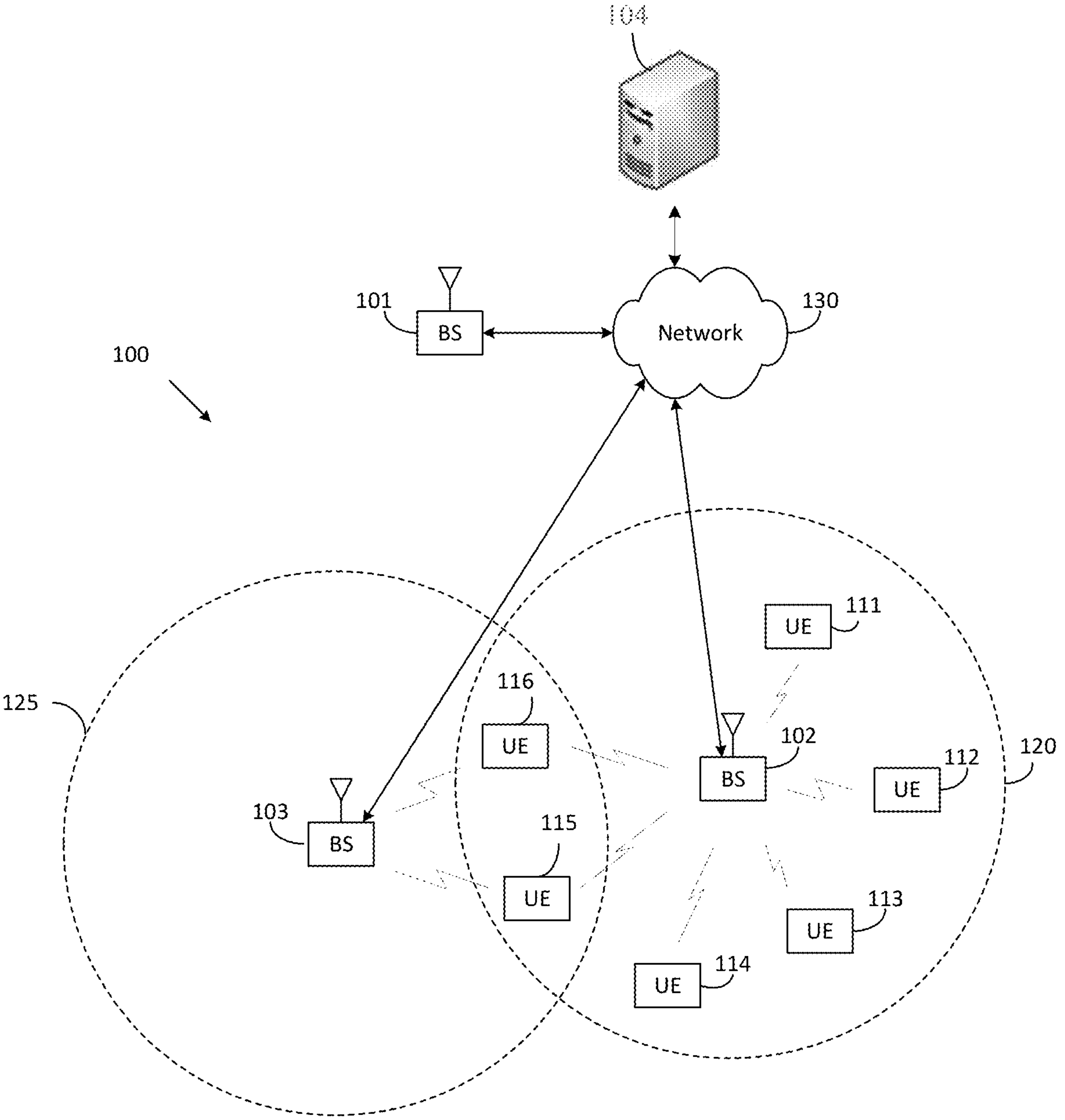
FIG. 1 illustrates an example wireless network according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system.

In orthogonal frequency division multiplexing (OFDM) systems, user equipment (UE) sounding reference signals are transmitted to the gNB for channel estimation. After removing known data, such as Zadoff-Chu (ZC) sequence, the noisy channel observation can be modeled as shown in Equation 1, where h denotes the ground-truth channel at a pilot subcarrier (sc) in the OFDM signal structure, and z denotes a Gaussian channel with zero mean and variance $\sigma^2$.

$$\hat{h} = h + z \tag{1}$$

Assuming $n_{SC}$ denotes the number of pilot subcarriers used for channel estimation, the noisy channel observation can be rewritten as shown in Equation 2, where $\hat{h}$ and h are length-$n_{SC}$ column vectors, and where $n_f$ can be expressed as shown in Equation 3, where CN indicates the distribution of circularly symmetric Gaussian noise with variance $\sigma^2$. In the case of performing channel estimation, the goal is to estimate the noiseless channel h.

$$\hat{h} = h + n_f \tag{2}$$

$$n_f \sim CN(0, \sigma^2 I_{nSC\times nSC}) \tag{3}$$

In the case of a Gaussian channel, it is known that the expected value of h conditional on $h+n_f$ is given by a linear filter, as expressed in Equation 4.

$$\hat{h} = G^*(h + n_f) \tag{4}$$

It is common to estimate the linear filter by minimizing the mean squared error (MMSE), as this generalizes the expected value for the Gaussian case, as expressed in Equation 5. Regarding terminology, it is understood herein that when a signal in the frequency domain is translated by an inverse discrete Fourier transform to the time domain, this disclosure refers to the time domain signal at taps, separated in time by some delay.

$$\hat{G} = \arg \min_G \mathbb{E}\left[\|h - G^*(h + n_f)\|^2\right] \tag{5}$$

Embodiments of this disclosure address multiple technical problems. One problem is the previous formulation of channel estimation as a minimum mean squared error (MMSE) problem that requires knowledge of difficult to estimate channel parameters for its solution. The MMSE estimate in an ideal case is expressed by Equation 6, where $\Phi$ denote the channel covariance and $\sigma^2$ denotes the channel noise. Accurate estimation of channel covariance $\Phi$ is quite difficult. Another problem, in case of a large number of subcarriers, the matrix requiring inversion may be highly ill-conditioned, with the conditioning worsening with increasing SNR.

$$G^* = \Phi(\Phi + \sigma^2 I)^{-1}(h + n_f) \tag{6}$$

As another problem, machine learning (ML) has been investigated as a tool to potentially help ameliorate these problems arising in modern wireless communication. However, for channel estimation the impact of ML so far, prior to this disclosure, has been minimal. As another problem, the potential application of deep neural networks (DNNs) for channel estimation is an active field of research, however, there is no existing production system where DNNs are employed. Further, pure ML solutions lack the transparency preferred for deployment to production systems.

This disclosure provides technical solutions to these problems arising in modern wireless communication. First, embodiments of this disclosure design a codebook of simple convolution kernels based on optimal or preferred rectangular filters, including determining one or more optimal or preferred symmetric Dirichlet kernels that are configured to generate a training set for a machine learning model. Additionally, embodiments of this disclosure provide a fast classifier for codeword selection, including providing a combination of clustering with one or more depth decision trees to identify one or more optimal or preferred codewords and select which optimal or preferred codeword to apply as a convolutional kernel.

This disclosure provides multiple technical advantages. As one example technical advantage, embodiments of this disclosure avoid the difficult to estimate full channel covariance matrix. As a second example technical advantage, the channel estimation executed according to this disclosure is robust with respect to the channel covariance. Specifically, when viewed in the time domain, the estimate (of the channel) is robust with respect to correlation of the power at different taps. The method according to this disclosure provides robustness with respect to tap power under some conditions. As a third example technical advantage, the method according to this disclosure has very low computational complexity and is implemented completely in the frequency domain, which is optimal or preferred for many practical orthogonal frequency division multiplexing (OFDM) systems. In the methods of this disclosure, a real-time implementation (such as executing channel estimation) involves no matrix inversion, but just a quick calculation of readily computable channel statistics and an evaluation of a fast classifier. As a fourth example technical advantage, this disclosure provides an explicit formula derived for the case of correlated noise that occurs after CS-2 cyclic shift removal, which can be generalized to CS-N. In this disclosure "CS-2" refers to cyclic shift 2, which is the case when there is only one target signal and one interfering signal. The term "CS-N" is a generalization of a cyclic shift with N−1 interfering signals. The filter provided in this disclosure handles colored noise as well as white noise.

Embodiments of this disclosure provide a hybrid approach, using machine learning to fill in gaps of classical analysis. This disclosure makes clear that the analysis herein pushes as far as possible, and then uses ML in a limited way. The hybrid analysis set forth in this disclosure is a methodology with good operational transparency that can be implemented in current production systems in a short amount of time. In some cases, the hardware architecture of a base station can obtain updated firmware to execute methods of this disclosure. The methodology of this disclosure is codebook based, using analysis to motivate codebook design, and then ML techniques (such as clustering and decision trees) to construct and implement the codebooks. Both of the ML techniques that this disclosure leverages require very little tuning and are easy to train, in contrast to DNN or support vector machine (SVM) regression-based channel estimation. This technical advantage (requiring very little tuning and being easy to train) enables embodiments of this disclosure to extend to (and be executed in) more environments than considered here. In some embodiments of this disclosure, the decision tree suggested for a live production environment also has lower complexity than the previously mentioned ML techniques.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipment (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, low complexity machine learning (ML) augmented robust channel estimation includes for designing a codebook of convolution kernels based on a time domain rectangular filter and training a decision tree classifier to select a codeword for real time channel estimation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
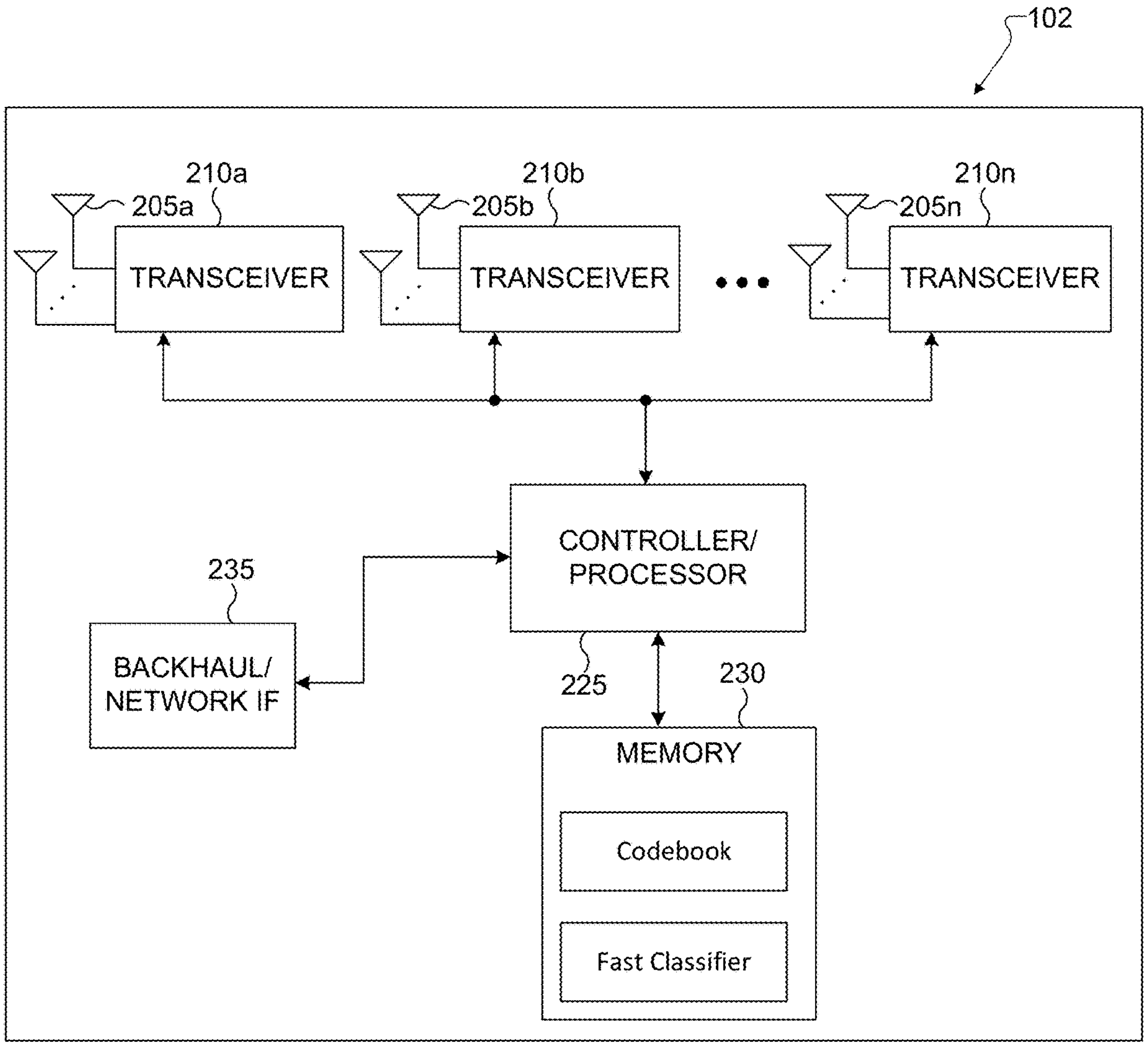
FIG. 2 illustrates an example gNodeB (gNB) according to this disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-convert the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The network interface 235 could support communications over any suitable wired or wireless connection(s). For example, when the gNB 102 is implemented as part of a cellular communication system (such as one supporting 5G/NR, LTE, or LTE-A), the network interface 235 could allow the gNB 102 to communicate with other gNBs over a wired or wireless backhaul connection. When the gNB 102 is implemented as an access point, the network interface 235 could allow the gNB 102 to communicate over a wired or wireless local area network or over a wired or wireless connection to a larger network (such as the Internet). The network interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, the gNB implements low complexity machine learning (ML) augmented robust channel estimation based on a codebook of convolution kernels generated based on a time domain rectangular filter and a decision tree classifier trained to select a codeword for real time channel estimation.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs. As a particular example, the controller/processor 225 could be divided into multiple processors, such as one or more central processing units (CPUs). In some embodiments of this disclosure, the controller/processor 225 does not include a graphic processing unit (GPU).

Figure 3:
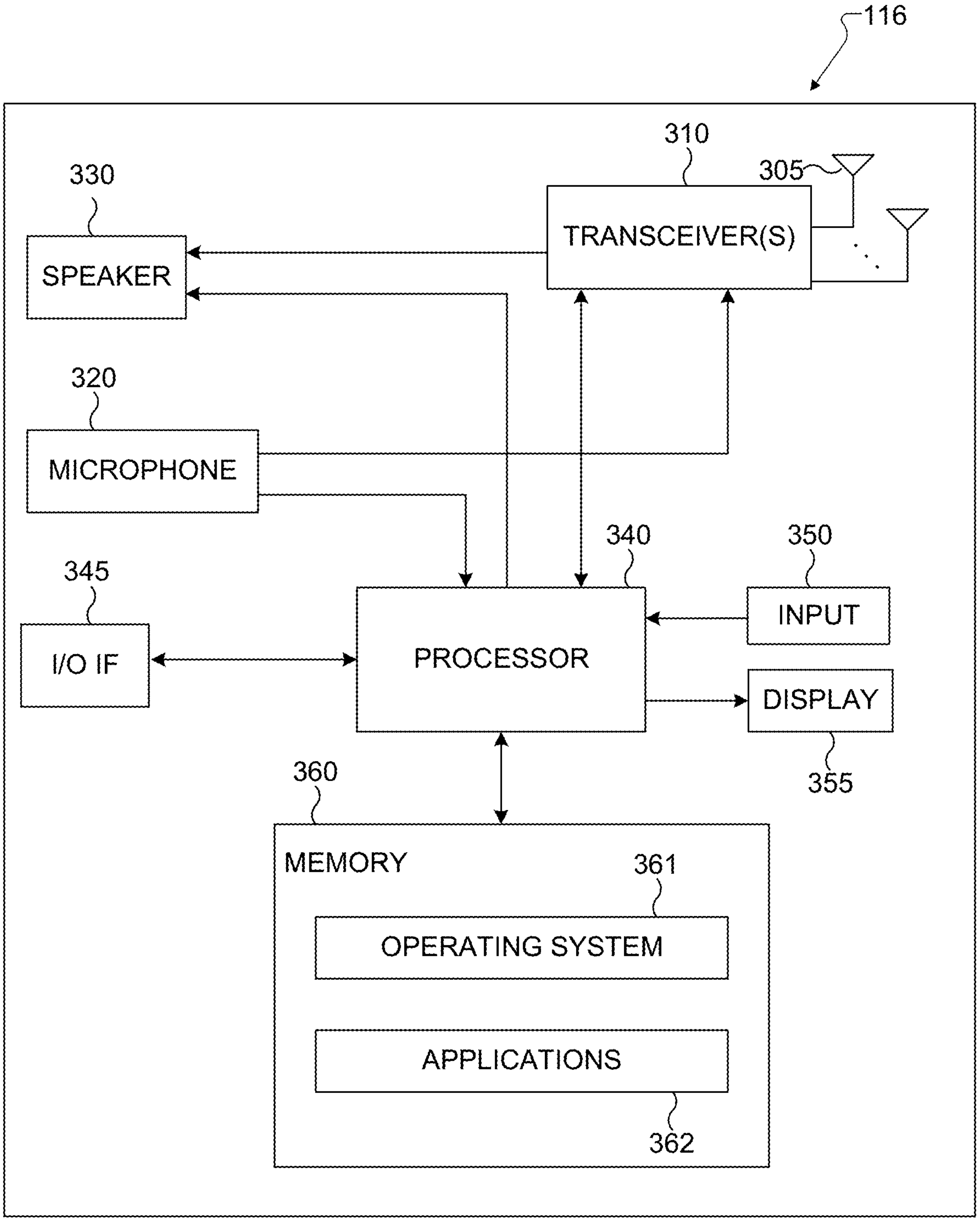
FIG. 3 illustrates an example user equipment (UE) according to this disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
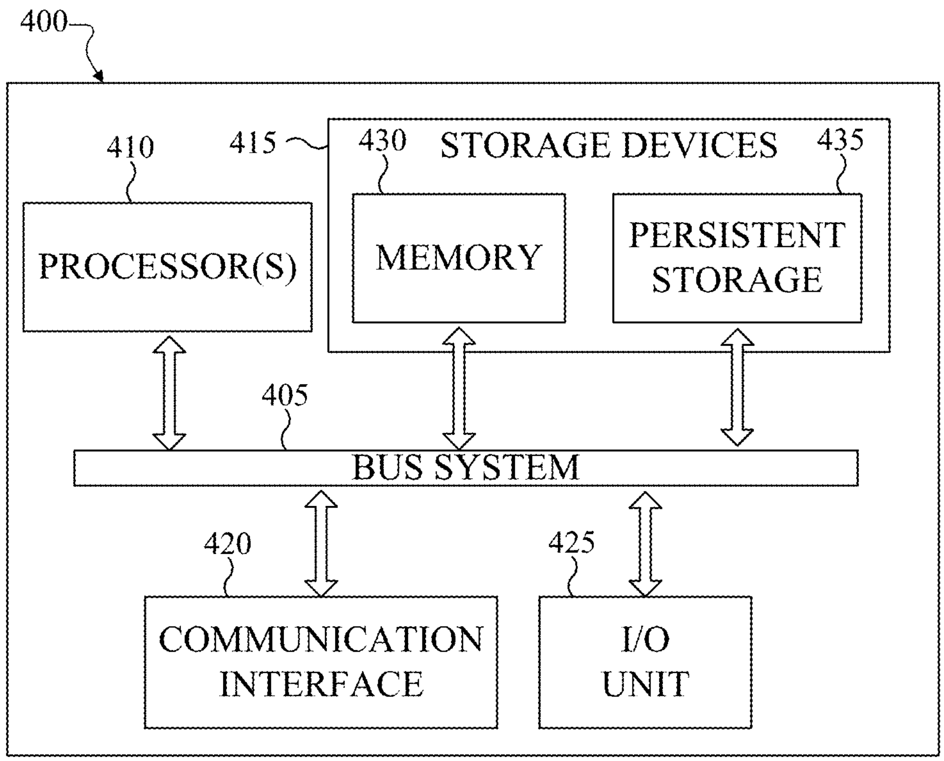
FIG. 4 illustrates an example electronic device according to this disclosure.

FIG. 4 illustrates an example electronic device in accordance with an embodiment of this disclosure. In particular, FIG. 4 illustrates an example server 400, and the server 400 could represent the server 104 in FIG. 1. The server 400 can represent one or more encoders, decoders, local servers, remote servers, clustered computers, and components that act as a single pool of seamless resources, a cloud-based server, and the like. The server 400 can be accessed by one or more of the gNBs 101-103 of FIG. 1 or another server.

As shown in FIG. 4, the server 400 includes a bus system 405 that supports communication between at least one processing device (such as a processor 410), at least one storage device 415, at least one communications interface 420, and at least one input/output (I/O) unit 425.

The processor 410 executes instructions that can be stored in a memory 430. The processor 410 can include any suitable number(s) and type(s) of processors or other devices in any suitable arrangement. Example types of processors 410 include microprocessors, microcontrollers, digital signal processors, field programmable gate arrays, application specific integrated circuits, and discrete circuitry. In certain embodiments, the processor 410 can design a codebook of convolution kernels based on a time domain rectangular filter and train a decision tree classifier to select a codeword for real time channel estimation.

The memory 430 and a persistent storage 435 are examples of storage devices 415 that represent any structure (s) capable of storing and facilitating retrieval of information (such as data, program code, or other suitable information on a temporary or permanent basis). The memory 430 can represent a random-access memory or any other suitable volatile or non-volatile storage device(s). For example, the instructions stored in the memory 430 can include instructions for designing a codebook of convolution kernels based on a time domain rectangular filter and training a decision tree classifier to select a codeword for real time channel estimation. The persistent storage 435 can contain one or more components or devices supporting longer-term storage of data, such as a read only memory, hard drive, Flash memory, or optical disc.

The communications interface 420 supports communications with other systems or devices. For example, the communications interface 420 could include a network interface card or a wireless transceiver facilitating communications over the network 130 of FIG. 1. The communications interface 420 can support communications through any suitable physical or wireless communication link(s). For example, the communications interface 420 can send, to one of the gNBs 101-103, a codebook of convolution kernels based on a time domain rectangular filter. As another example, the communications interface 420 can send a trained decision-tree classifier to one of the gNBs 101-103.

The I/O unit 425 allows for input and output of data. For example, the I/O unit 425 can provide a connection for user input through a keyboard, mouse, keypad, touchscreen, or other suitable input device. The I/O unit 425 can also send output to a display, printer, or other suitable output device. Note, however, that the I/O unit 425 can be omitted, such as when I/O interactions with the server 400 occur via a network connection.

Although FIG. 4 illustrates an example of an electronic device, various changes can be made to FIG. 4. For example, various components in FIG. 4 could be combined, further subdivided, or omitted and additional components could be added according to particular needs. As a particular example, the processor 410 could be divided into multiple processors, such as one or more central processing units (CPUs) and one or more graphics processing units (GPUs). In addition, as with computing and communication, electronic devices and servers can come in a wide variety of configurations, and FIG. 4 does not limit this disclosure to any particular electronic device or server.

Figure 5:
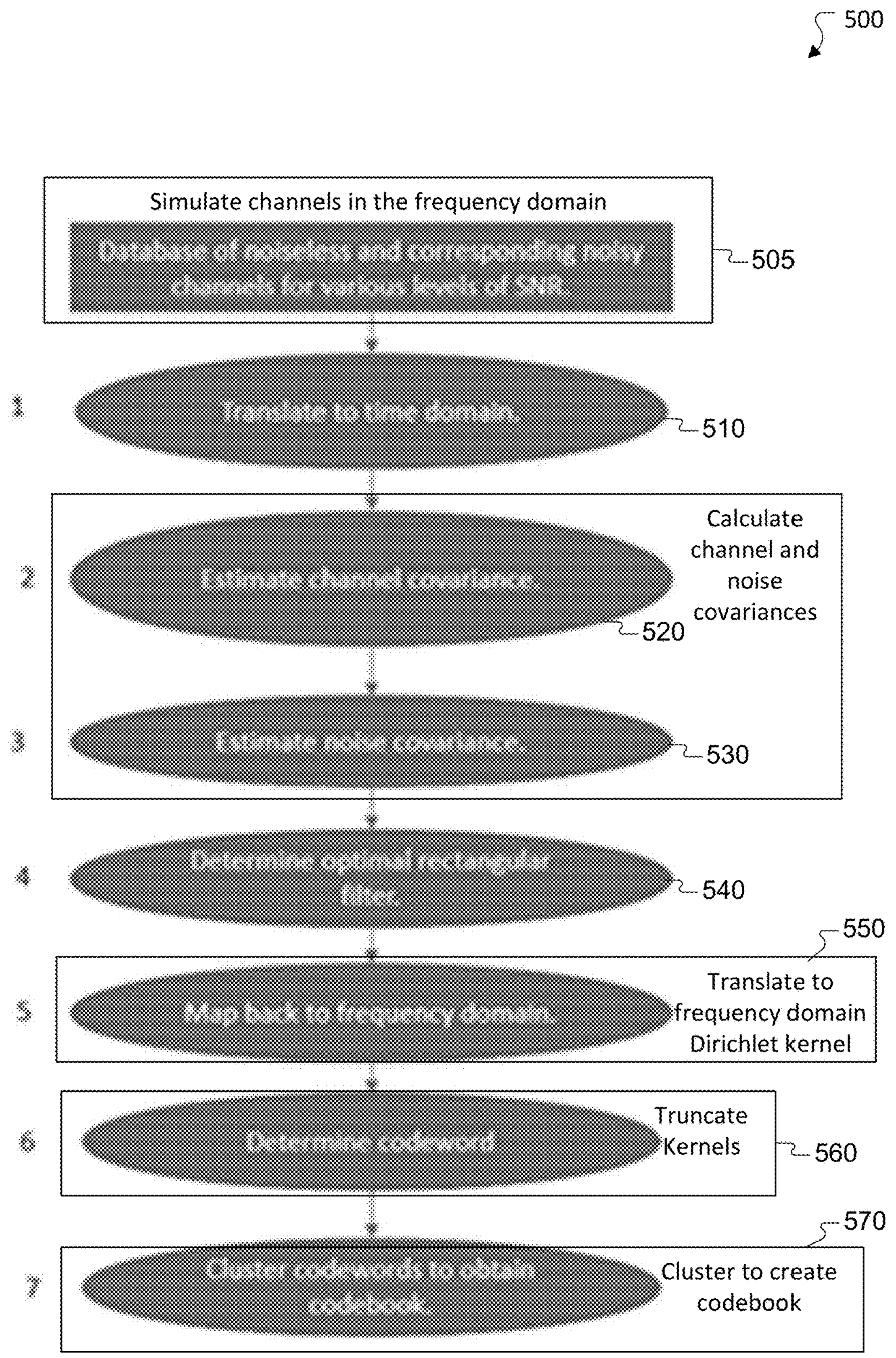
FIG. 5 illustrates a method for designing a codebook, according to this disclosure.

FIG. 5 illustrates a method 500 for designing a codebook, according to this disclosure. The embodiment of the method 500 shown in FIG. 5 is for illustration only. Other embodiments of the method 500 could be used without departing from the scope of this disclosure. For ease of explanation, the method 500 will be described as being implemented in the server 400 of FIG. 4. However, the method 500 could be implemented in any other suitable device.

First, before describing details of the method 500, this disclosure provides some of the analytic foundation for understanding the embodiments of this disclosure. The MMSE can be expressed as shown in Equation 7, given a channel h, channel noise in the frequency domain $n_f$, and filter G. Embodiments of this disclosure aim to minimize the MMSE, where E(•) denotes expectation with respect to the joint distribution of the channel and noise, and where the * denotes a conjugate transpose operation.

$$\mathbb{E}\left[\|h - G^*(h + n_f)\|^2\right] \tag{7}$$

The frequency domain variables h and $n_f$ are related to the time domain variables y and $n_t$ by a Discrete Fourier Transform (DFT), as shown in Equation 8 and Equation 9.

$$h = \mathcal{F} y \tag{8}$$

$$n_f = \mathcal{F} n_t \tag{9}$$

This allows for expressing the mean squared error (MSE) in terms of the time domain variables. The following derivation of the MSE of Equation 10 is based on an assumption that the DFT has been normalized so that F F*=I, and is based on a matrix R that is expressed according to Equation 11. The equation F F*=I demonstrates that the mean squared error expressed in the time domain is similar to the expression in the frequency domain.

$$\begin{aligned}\mathbb{E}\left[\|h - G^*(h + n_f)\|^2\right] &= \mathbb{E}\left[\|\mathcal{F} y - G^*\mathcal{F}(y + n_t)\|^2\right] = \\ &\mathbb{E}[(\mathcal{F} y - G^*\mathcal{F}(y + n_t))^* X(\mathcal{F} y - G^*\mathcal{F}(y + n_t))] = \\ &\mathbb{E}[(y - \mathcal{F}^* G^*\mathcal{F}(y + n_t))^*\mathcal{F}^* x\mathcal{F}(y - \mathcal{F}^* G^*\mathcal{F}(y + n_t))] = \\ &\mathbb{E}[(y - R^*(y + n_t))^*(y - R^*(y + n_t))]\end{aligned} \tag{10}$$

$$R = \mathcal{F}^* G\mathcal{F} \tag{11}$$

The MSE is further simplified using invariance of the trace operator under cyclic permutation and based on an assumption of independence of noise from the channel, as shown in the following derivation of the MSE of Equation 12, where the matrix Ω is expressed according to Equation 13.

$$\begin{aligned}&= \mathbb{E}[TR((y - R^*(y + n_t))^*(y - R^*(y + n_t)))] = \\ &\mathbb{E}[TR((y - R^*(y + n_t))(y - R^*(y + n_t))^*)] = \\ &TR(\mathbb{E}[yy^* - R^*(y + n_t)y^* - y(y^* + n_t^*)R + R^*(y + n_t)(y^* + n_t^*)R]) = \\ &Tr(\Omega - R^*\Omega - \Omega R + R^*(\Omega + \Lambda)R)\end{aligned} \tag{12}$$

$$\Omega = \mathbb{E}[yy^*],\ \Lambda = \mathbb{E}[n_t n_t^*] \tag{13}$$

In some embodiments of this disclosure do not assume that $\Lambda=\sigma^2 I$ because this may not be true after certain preprocessing stages (e.g., cyclic shift removal). In such embodiments, the channel power can be expressed according to Equation 14, thereby enabling embodiments of this disclosure to focus on minimizing a controllable term, such as the controllable term shown in Equation 15.

$$Tr(\Omega) = Tr(\mathbb{E}[yy^*]) = \mathbb{E}[Tr(yy^*)] = \mathbb{E}[Tr(y^* y)] = \mathbb{E}\left[\|y\|^2\right] \tag{14}$$

$$g(R, \Omega, \Lambda) = Tr(R^*(\Omega + \Lambda)R - R^*\Omega - \Omega R) \tag{15}$$

An MMSE filter obtained from minimizing the controllable term shown in Equation 15 with respect to R can be referred to as an optimal or preferred MMSE filter, which is expressed in Equation 16.

$$R_{opt} = (\Omega + \Lambda)^{-1}\Omega \tag{16}$$

To generate the filters in this disclosure, the channel covariance can be approximated by the diagonal entries, based on an assumption that the noise is independently and identically (i.i.d) Gaussian, such that the corresponding estimate $$R_{est}^{opt}$$

would be a diagonal matrix with real entries. Therefore, these filters are first of the form shown in Equation 17. The number of channel measurements is denoted as n, which is the same n as the number of subcarrier frequencies.

$$R_{diag} = \begin{bmatrix} r_1 & 0 & 0 & \ldots & 0 \\ 0 & r_2 & 0 & \ldots & 0 \\ \vdots & \vdots & \vdots & \ldots & \vdots \\ 0 & 0 & 0 & \ldots & r_n \end{bmatrix} \tag{17}$$

The controllable term can then be expressed according to Equation 18.

$$\begin{aligned}Tr(R_{diag}\Omega) &= \sum\nolimits_{i=1}^{n} r_i\Omega_{ii} \\ Tr\left(R_{diag}^*(\Omega + \Lambda)R_{diag}\right) &= \sum\nolimits_{i=1}^{n} r_i^2(\Omega_{ii} + \Lambda_{ii})\end{aligned} \tag{18}$$

The gain $g(R_{diag}, \Omega, \Lambda)$ can be expressed as shown in Equation 19. The off diagonal terms $\Omega_{ij}$ for i≠j do not appear in the gain $g(R_{diag}, \Omega, \Lambda)$ of Equation 19. This filter is robust with respect to the off diagonal channel covariance. Since $\Omega_{ii}$ is the power at the $i^{th}$ tap in the time domain, this filter is robust with respect to the correlation in the channel gain at different taps.

$$g(R_{diag}, \Omega, \Lambda) = \sum\nolimits_{i=1}^{n} r_i^2(\Omega_{ii} + \Lambda_{ii}) - 2\sum\nolimits_{i=1}^{n} r_i\Omega_{ii} \tag{19}$$

For later comparison, the gain $g(R_{diag}, \Omega, \Lambda)$ is minimized when the condition of Equation 20 is TRUE.

$$r_i = \frac{\Omega_{ii}}{\Omega_{ii} + \Lambda_{ii}} \tag{20}$$

In which case, the minimized gain can be expressed as shown in Equation 21.

$$g\left(R_{diag}^{opt}, \Omega, \Lambda\right) = -\sum\nolimits_{i=1}^{n} \frac{\Omega_{ii}^{2}}{\Omega_{ii} + \Lambda_{ii}} \quad (21)$$

A further simplification is achieved based on an assumption that R takes the form shown in Equation 22. That is, $R_{rect}$ is constant on the first l taps and zero elsewhere. Therefore, such filters can be referred to as "rectangular" filters. In addition to robustness with respect to correlation between taps, these filters also offer some robustness with respect to tap power, especially if all the signal power is completely covered by the first l taps.

$$R_{rect} = \begin{bmatrix} rI_{|x|} & O_{|xn-|} \\ O_{n-|x|} & O_{n-|xn-|} \end{bmatrix} \quad (22)$$

Regarding the MSE, the gain can be expressed as shown in Equation 23.

$$g(R_{rect}, \Omega, \Lambda) = r^{2}\sum\nolimits_{i=1}^{l}(\Omega_{ii} + \Lambda_{ii}) - 2r\sum\nolimits_{i=1}^{l}\Omega_{ii} \quad (23)$$

A minimization can be applied to the gain with respect to l and r, as shown in Equation 24.

$$\min_{l}\min_{r}\left\{r^{2}\sum\nolimits_{i=1}^{l}(\Omega_{ii} + \Lambda_{ii}) - 2r\sum\nolimits_{i=1}^{l}\Omega_{ii}\right\} \quad (24)$$

The inner optimization has the analytic solution, as shown in Equation 25.

$$r_{opt}(l) = \frac{\sum_{i=1}^{l}\Omega_{ii}}{\sum_{i=1}^{l}(\Omega_{ii} + \Lambda_{ii})} \quad (25)$$

When this $r_{opt}(l)$ is combined into the previous Equation 24, the resulting minimization problem is shown is shown as Equation 26.

$$\min_{l}\left\{-\frac{\left(\sum_{i=1}^{l}\Omega_{ii}\right)^{2}}{\sum_{i=1}^{l}(\Omega_{ii} + \Lambda_{ii})}\right\} \quad (26)$$

Therefore, to determine an optimal or preferred rectangular filter, first solve Equation 27, and then plug the solution into Equation 25 to obtain the corresponding height of the rectangular filter.

$$\max_{l}\left\{-\frac{\left(\sum_{i=1}^{l}\Omega_{ii}\right)^{2}}{\sum_{i=1}^{l}(\Omega_{ii} + \Lambda_{ii})}\right\} \quad (27)$$

By comparing the $R_{rect}$ to the $R_{opt}$, the optimal or preferred rectangular filter is also an optimal or preferred MMSE filter for the case where both $\Omega_{diag}$ and $\Lambda_{diag}$ are diagonal, as shown in Equation 28 and Equation 29, respectively.

$$\Omega_{diag} = \begin{bmatrix} \frac{1}{l}\left(\sum_{i=1}^{l}\Omega_{ii}\right)I_{lxl} & O_{lxn-1} \\ O_{n-lx1} & O_{n-1xn-1} \end{bmatrix} \quad (28)$$

$$\Lambda_{diag} = \frac{1}{l}\left(\sum\nolimits_{i=1}^{l}\Lambda_{ii}\right)I_{nxn} \quad (29)$$

Now referring to the method 500 of FIG. 5, blocks 505-570 show how the above analytic development guides the machine learning technique in this disclosure. The ML technique of this disclosure includes two main designs: (1) design a new codebook of simple convolution kernels as codewords; and (2) design a fast classifier. These ML techniques can be executed "offline," such as by a server.

After the codebook has been generated and the fast classifier has been trained according to the ML technique of this disclosure, a base station can obtain these two main designs and apply them "online." Given noisy channel data, a few simple and low complexity statistics are used (for example, "online" by the base station) as input to the fast classifier to select a codeword for channel estimation.

At block 505, the server 400 acquires information associated with channel and noise covariances. As one example, the server 400 simulates a large number of noiseless channels of various types (e.g., TDL-A, TDL-B, TDL-C, UMI) which have already been preprocessed (e.g., cyclic shift removal, timing compensation) and for various levels of noise. These simulated noiseless channels and simulated noisy channels for various levels of SNR can be stored in a database, and can represent reference signals that a gNB could receive from a UE. As another example, the server 400 accesses a database of noiseless channels and corresponding noisy channels for various levels of signal-to-noise ratio (SNR).

The following procedures of blocks 510-570 are performed for each $n_{SC} \times n_{ant}$ sample, which is each (number of subcarriers)×(number of antennas) sample. Each sample includes a noiseless channel and corresponding noisy channel. A dataset of multiple samples are associated with noiseless channels and corresponding noisy channels for various levels of signal-to-noise ratio (SNR).

At block 510, the server 400 translates the channel from the frequency domain to the time domain. For example, the server 400 can perform an inverse discrete Fourier transform (IDFT) to transform the channel to the time domain, as express in Equation 30. The vector hj denotes single or various pilots, usually in the frequency domain.

$$y_j = \mathcal{F}^{-1}h_j,\ j = 1, \ldots, n_{ant} \quad (30)$$

At blocks 520-530, the server 400 calculates channel and noise covariances. At block 520, the server 400 estimates channel covariance. For example, the server 400 can estimate $\Omega_{ii}$ by averaging the power per tap across the antennas to determine the diagonal entries for the power covariance, as expressed in Equation (31).

$$\Omega_{ii} = \frac{1}{n_{ant}}\sum\nolimits_{j=1}^{n_{ant}}|y_j[i]|^{2},\ j = 1, \ldots, n_{SC} \quad (31)$$

At block 530, the server 400 estimates noise covariance. The noise interference covariance $Cov(n_f)$ in the frequency domain, as expressed by the matrix in Equation 32, can be translated to the time domain, as expressed by the diagonal entries $\Lambda_{ii}$ of the corresponding time matrix in Equation 33. Noise interference in the frequency domain is denoted by $n_f$, but in the time domain is denoted by $n_t$. More particularly, the server 400 can estimate $\Lambda_{ii}$, thereby estimating noise covariance in the time domain. For example, in case of a single user, if $n_f$ is Gaussian with covariance $\sigma^2 I$, then $\Lambda_{ii}=\sigma^2$ and $n_t$ is also Gaussian with covariance $\sigma^2 I$. In the case of a multiuser interference (MUI) with two UEs, after cyclic shift removal a tridiagonal frequency domain covariance is determined, as expressed in Equation 32.

$$\mathrm{Cov}(n_f) = \begin{bmatrix} \frac{\sigma^2}{2} & \frac{\sigma^2}{4} & 0 & \ldots & 0 \\ \frac{\sigma^2}{4} & \frac{\sigma^2}{2} & \frac{\sigma^2}{4} & \ldots & 0 \\ \vdots & \vdots & \vdots & \ldots & \vdots \\ 0 & 0 & \ldots & \frac{\sigma^2}{4} & \frac{\sigma^2}{2} \end{bmatrix} \tag{32}$$

$$\Lambda_{ii} = \frac{\sigma^2}{2}\left(1 + \frac{n-1}{n}\cos\left(\frac{2\pi(i-1)}{n}\right)\right) \tag{33}$$

Figure 6:
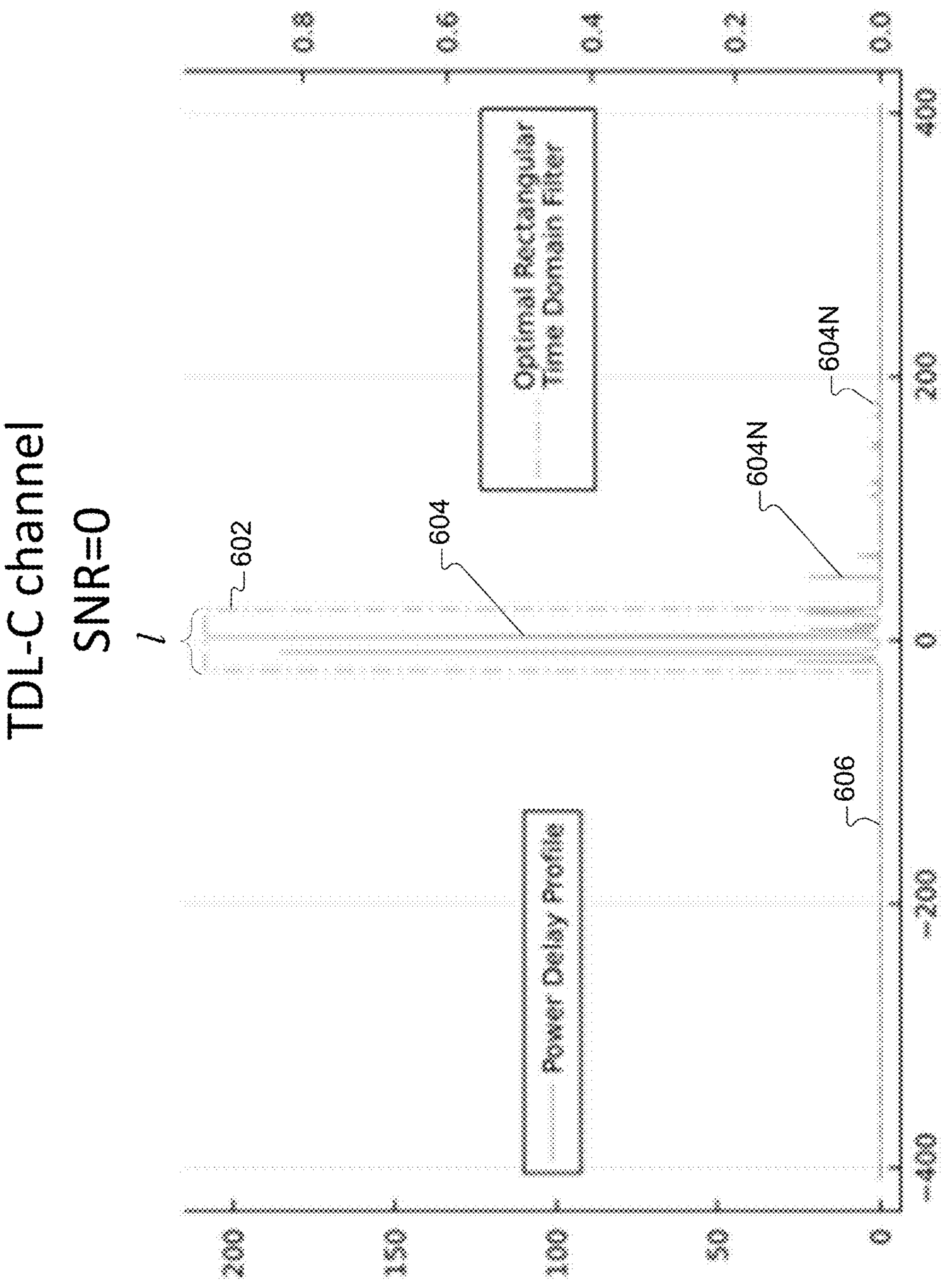
FIG. 6 illustrates an optimal or preferred rectangular filter, according to embodiments of this disclosure.

At block 540, the server 400 determines an optimal or preferred rectangular filter. Particularly, the server 400 determines one or more optimal or preferred time domain rectangular filters. As an example, FIG. 6 illustrates an optimal or preferred rectangular filter.

The server 400 applies the optimal or preferred time domain rectangular filters to the power delay profiles of the samples, respectively, thereby generating time domain covariance matrices. The special structure of the time domain covariance matrices allows the corresponding frequency domain matrices to each be calculated by a single discrete Fourier Transform (DFT).

Figure 7:
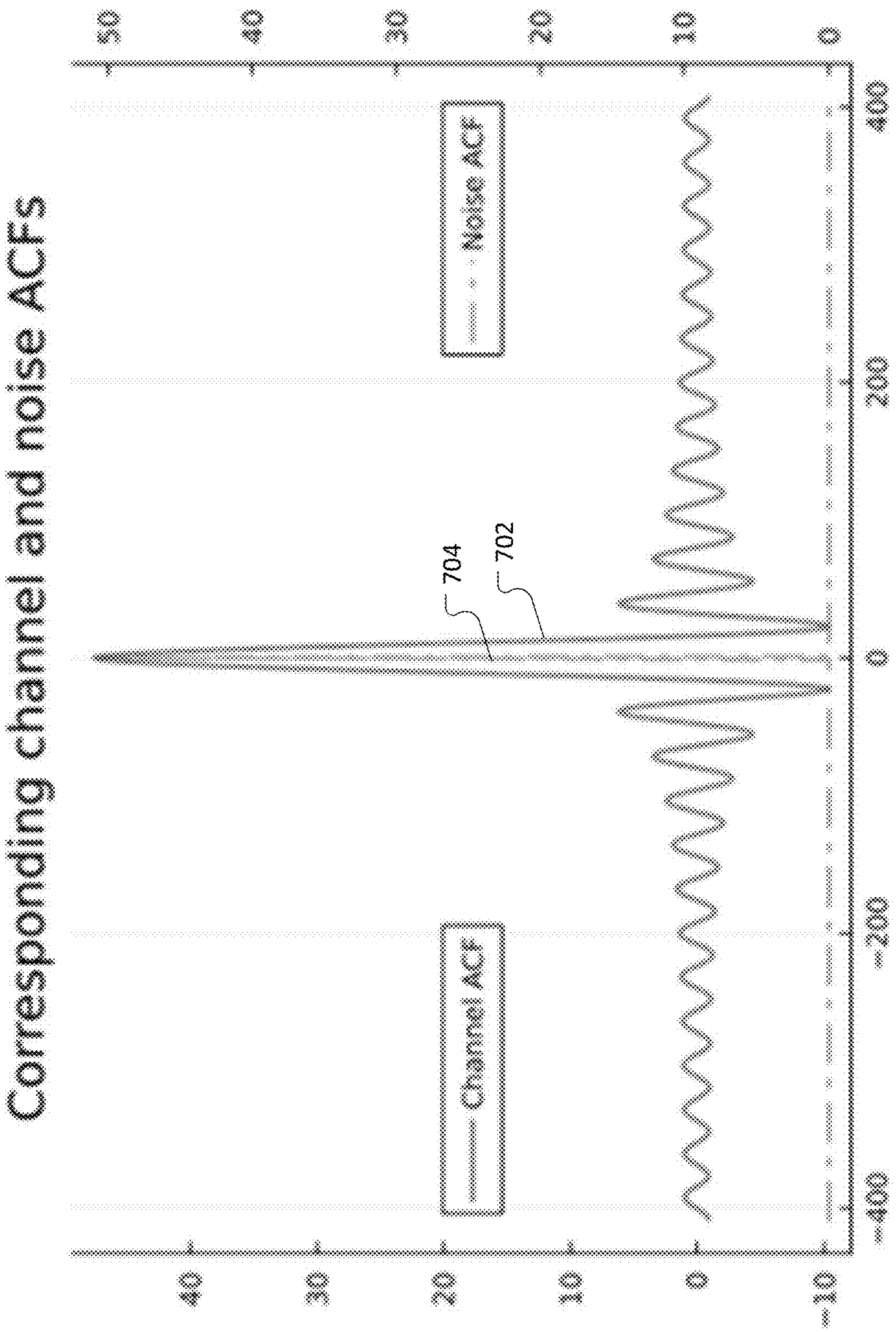
FIG. 7 illustrates an example channel autocorrelation function (AFC) and an example noise AFC, according to embodiments of this disclosure.

At block 550, the server 400 maps the corresponding time domain covariance matrices to the frequency domain, for example by performing a DFT, as shown in Equation 34. For example, the server 400 maps the corresponding time domain covariance matrices to the frequency domain Dirichlet kernel. FIG. 7 shows an example of a corresponding autocorrelation function (ACF).

$$\Omega_{freq} = \mathcal{F}\Omega_{diag}\mathcal{F}^*,\ \Lambda_{freq} = \mathcal{F}\Lambda_{freq}\mathcal{F}^* \tag{34}$$

At block 560, the server 400 determines a codeword. In some embodiments, to determine the codeword, the server 400 truncates kernels. That is, the server 400 determines N codewords as the truncated kernels. The codewords can be in the frequency domain. More particularly, to construct a Toeplitz (2K+1)×(2K+1) channel covariance matrix Φ, the server 400 samples the ACFs corresponding to $\Omega_{freq}$ at lags 0, . . . 2K. Analogously, the server 400 performs similar functions for $\Lambda_{freq}$ to construct a noise covariance Σ. The server 400 defines a codeword as expressed in Equation 35. In some embodiments, the server 400 truncates each of the frequency domain Dirichlet kernels such that the number of coefficients remaining in the Dirichlet kernel after the truncation is the same as used by a moving average calculation. As a technical advantage of utilizing existing memory hardware, the size of computing resources used for storage of codewords generated according to the method 500 can be similar to the size of computing resources used for storage of codewords that are used with a low complexity channel estimation that uses a moving average calculation.

$$w_{codeword} = \Phi[K+1:\ K+1,:\ ](\Phi + \textstyle\sum)^{-1} \tag{35}$$

At block 570, the server 400 creates the codebook. More particularly, the server 400 clusters codewords to create (such as, to generate) the codebook. Given a large number of such codewords created by a training set, the server 400 can cluster these codewords using K-means or K-Medoids clustering algorithm. The cluster centers (also referred to as centroids) are used to determine the codebook. As a technical advantage, the size of the codebook is small. For example, the codebook can include a small number of vectors, such as 6-8 vectors, where each vector includes 25 real entries. In other embodiments, each vector in the codebook can include 25 complex entries. The codebook generated according to the method 500 can be applied to any of the wireless signals that the gNB 102 receives.

FIG. 6 illustrates an optimal or preferred rectangular filter 602, according to embodiments of this disclosure. The x-axis represents taps in the time domain. The optimal or preferred rectangular filter 602 can be applied to a power delay profile 604. In order to compensate for noise, the optimal or preferred rectangular filter 602 does not cover the power at all the taps. The server 400 determines the optimal or preferred rectangular filter width l that spans some (but not all) of the taps, and the server 400 determines the time domain covariance matrices. The optimal or preferred rectangular filter 602 discards noise, which is below a lower limit 606 of the optimal or preferred rectangular filter, and which applies to taps that are outside a width l of the filter. The optimal or preferred rectangular filter 602 discards each of the noise portions 604N of the power delay profile 604. Also, for taps inside the width l of the filter, which can be centered about a centralized tap (e.g., 0 value of x-axis; current time on the time-domain axis), the filter enables the signal to pass through. In other word, l denotes the number of taps to include within the optimal or preferred rectangular filter, and the variable l is the variable that the server 400 optimizes to determine the width of the optimal or preferred rectangular filter 602.

The optimal or preferred rectangular filter 602, which corresponds to the optimal or preferred rectangular filter width l, is one among various rectangular filter designs that the server 400 could determine or could select. Each of the various choices of rectangular filter designs has a different width defined by a different number of lags, and Equation 26 can be used to determine the loss associated with that choice of filter. As such, these noise portions 604N not only represent noise, but also represent some of the power of the power delay profile 604 that is ignored because if a rectangular filter has a width that is too wide, then the output from the filter will include too much noise relative to the power of the power delay profile 604. If a rectangular filter has a width that is too narrow, then the filter will discard some of the useful transmissions by discarding power from the useful portions of the power delay profile 604. As an example only, the lower limit 606 is expressed as SNR=0, but other lower limits can have a different SNR value.

FIG. 7 illustrates an example channel autocorrelation function (AFC) 702 and an example noise AFC 704, according to embodiments of this disclosure. A filtered signal in the time domain is generated as the portion of power delay profile 604 that passes through (and is not discarded by) the optimal rectangular filter 602. This filtered signal can be translated to the frequency domain, as shown by the channel AFC 702. The shape of the channel AFC 702 can be that of a frequency-domain Dirichlet kernel. The shape of the channel AFC 702 is not flat, but in contrast, a moving average calculation would have a completely flat shape.

Figure 8:
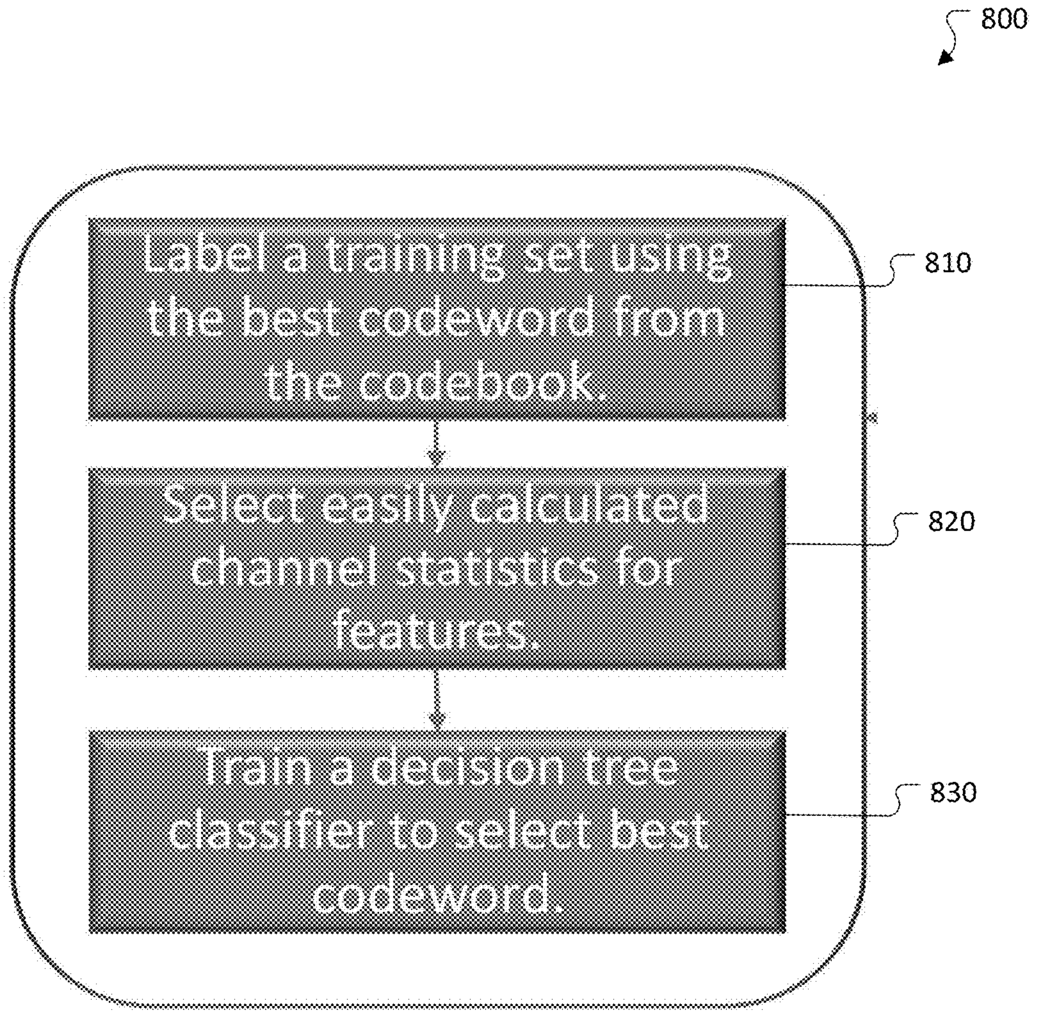
FIG. 8 illustrates a method for calculating features and training decision tree classifier to select a codeword for real-time channel estimation based on the trained decision tree classifier, in accordance with embodiments of this disclosure.

FIG. 8 illustrates a method 800 for calculating features and training decision tree classifier to select a codeword for real-time channel estimation based on the trained decision tree classifier, in accordance with embodiments of this disclosure. The embodiment of the method 800 shown in FIG. 8 is for illustration only. Other embodiments of the method 800 could be used without departing from the scope of this disclosure. For ease of explanation, the method 800 will be described as being implemented in the server 400 of FIG. 4. However, the method 800 could be implemented in any other suitable device. The codebook utilized in the method 800 is the codebook generated at block 570 of the method 500 of FIG. 5, as such, the method 800 can be executed after the method 500 of FIG. 5.

At block 810, the server 400 labels a training dataset (for training a decision tree classifier) using a codeword selected from the codebook. For ease of explanation, the codeword selected from the codebook is referred to as the "best" codeword.

At block 820, the server 400 selects, as features, channel statistics that are easily calculatable. The NMSE is an example of a target feature. Easily calculatable refers to low calculation complexity. More particularly, on the training dataset, the server 400 selects a few features with low calculation complexity (such as, noise variance, channel ACF at a few lags, etc.) to serve as features for the fast classifier, and the server 400 labels the sample according to the best codeword from the codebook. Specifically, for any $n_{NC} \times n_{ant}$ noiseless sample G from the training data and level of noise $\sigma^2$, the server 400 constructs the corresponding noisy sample H, and labels the features calculated from the noisy sample with index j* as expressed in Equation 36, with the $w_j$ range over the codebook.

$$j^* = \arg \min_j \sum_{k=K+1}^{n_{SC}-K} \| w_j * H[k-K: k+K, : - G[k: k, : ] \|^2 \quad (36)$$

For each respective sample in the training dataset, the server 400 applies each of the N codewords from the codebook to that respective sample. From among the N codewords, whichever codeword that, when applied to that respective sample, estimates the clean channel best from the noisy channel will be selected by the server 400 as the label for the classifier. For example, estimating the clean channel best can refer to estimating the noiseless channel with a lowest loss associated with that choice of codeword, where loss can be determined based on Equation 26. This procedure at block 820 of selecting a cluster centroid that best estimates the clean channel has less computational complexity (requires fewer computing resources) than computing an optimal or preferred filter in real time $n_{NC} \times n_{ant}$ samples (such as 6,528 samples in the case of 32 Rx antenna with 204 subcarriers per antenna).

At block 830, the server 400 trains a decision tree classifier to select the "best" codeword. The decision tree classifiers are highly efficient to evaluate, as they involve only checking inequalities on coordinates and relatively few arithmetic operations at the selected leaf. The features used for classification have low computational complexity to improve overall efficiency. Advantages of decision trees is that they use little memory and are fast to evaluate. So the overhead in evaluating the decision tree is negligible in terms of implementation.

As a technical advantage, the fast classifier according to some embodiments of this disclosure can be implemented by the gNB 102 without adding overhead to the gNB by utilizing channel statistics (calculated by the gNB) as the features that the fast classifier will use for classification. In other embodiment of this disclosure, a fast classifier can be implemented by adding a marginal amount of overhead to the gNB 102, which is associated with the gNB 102 calculating an ACF of the received reference signal at a few different lags, which can be a few dot products calculations the gNB executes.

Note that although the method 800 of FIG. 8 refers to a fast classifier that is a decision tree, other types of fast classifiers can be used. FIGS. 10-14 show test results from the server 400 executing the methods of FIGS. 5 and 8, and show that tests were performed using random forests with 10 to 1,000 trees and support vector machines (SVMs). The observed difference in classification accuracy was marginal. As random forests are ensembles of decision trees, their complexity grows linearly with the number of underlying trees. Evaluation of SVMs also was relatively slow. First, the number of support vectors observed in tests were fairly large, over 1,000 per codeword (which can be equal to class, in the language of ML classification). Further, SVM classification relies on a one-vs-rest approach, further slowing down evaluation.

Figure 9:
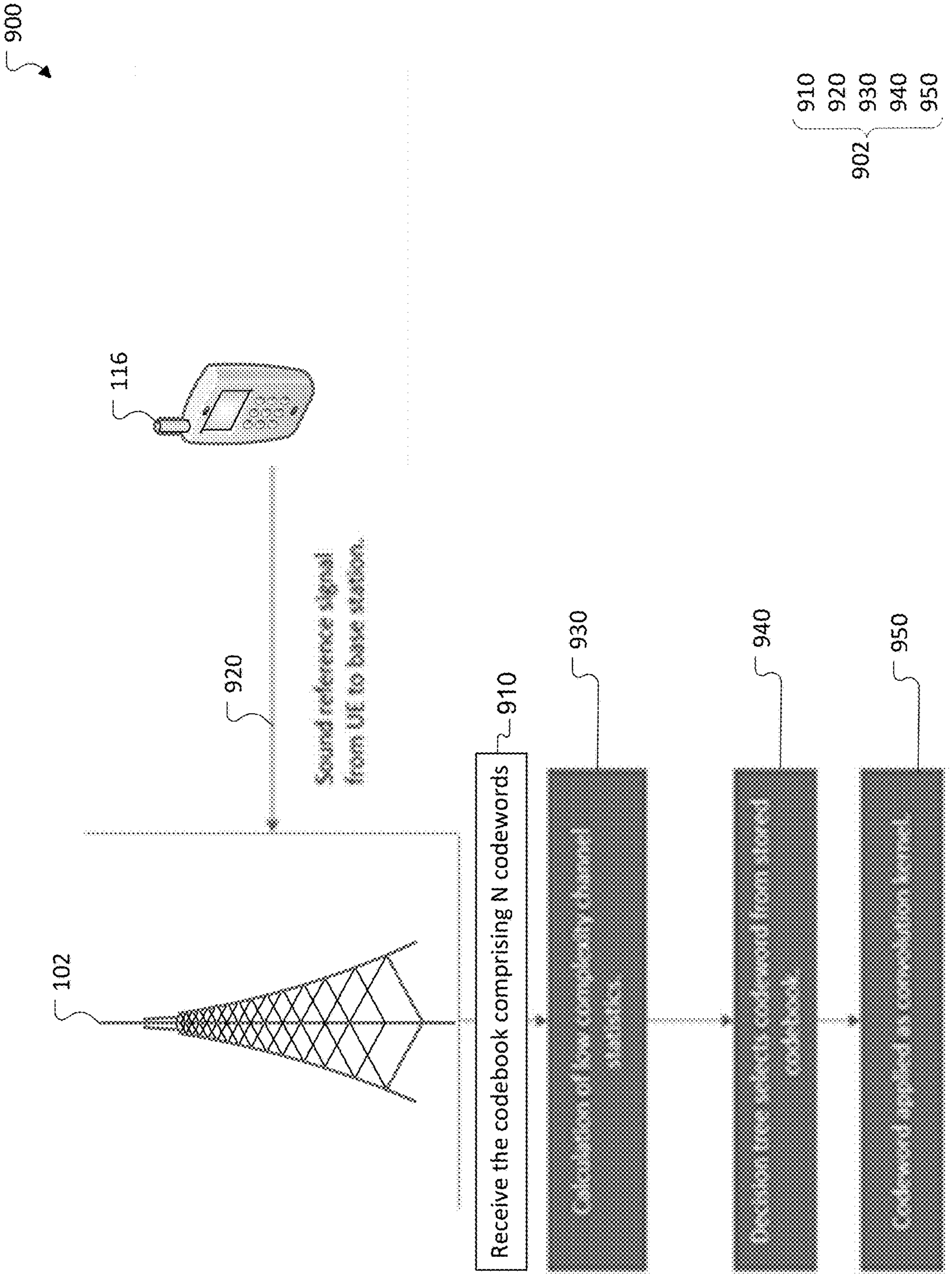
FIG. 9 illustrates an example production system that implements the trained decision tree classifier, in accordance with embodiments of this disclosure.
Figure 10:
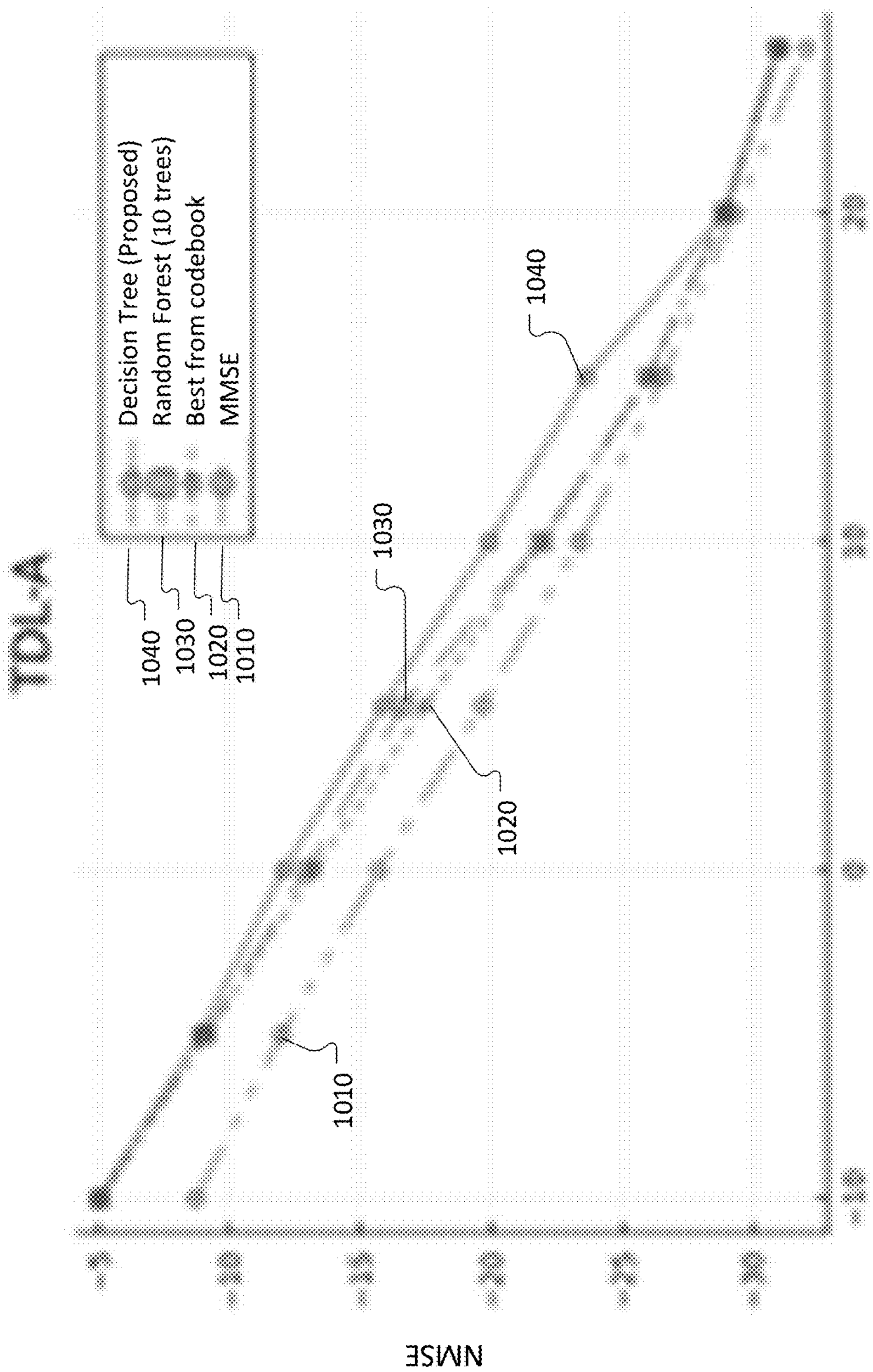
FIGS. 10-14 illustrate examples of experimental test results from experiments conducted using simulated channels, in accordance with embodiments of this disclosure.

FIG. 9 illustrates an example production system 900 that implements the trained decision tree classifier, in accordance with embodiments of this disclosure. The embodiment of the system 900 shown in FIG. 9 is for illustration only. Other embodiments of the system 900 could be used without departing from the scope of this disclosure.

The system 900 will be described as including the gNB 102 of FIG. 2 and the UE 116 of FIG. 3. The system 900 performs a method 902 of channel estimation, referred to as real-time channel estimation, and this method 902 includes the procedures of blocks 910, 920, 930, 940, and 950. The method 902 is described as being executed in the gNB 102. However, the method 902 could be implemented in any other suitable device. The codebook utilized in the method 902 is the codebook generated at block 570 of the method 500 of FIG. 5, as such, the method 902 can be executed after the method 500 of FIG. 5. The fast classifier utilized in the method 902 is the fast classifier trained according to the method 800 of FIG. 8, as such, the method 902 can be executed after the method 800 of FIG. 8. Although the fast classifier in the method 902 is described as being a decision tree classifier, it is understood that other types of suitable fast classifiers could be used.

At block 910, the gNB 102 obtains the codebook generated by the server 400. For example to obtain the codebook, the gNB 102 can receive, from the server 400, the codebook comprising the N codewords.

At block 920, the gNB 102 receives a reference signal from a UE 116. The reference signal can be a sound reference signal that the UE 116 transmitted to the gNB 102.

At block 930, the gNB 102 calculates channel statistics using a low complexity algorithm. An example of a low complexity algorithm is a moving average calculation, which is a kind of local averaging. An example of channel statistics include a timing offset, which can be for each subcarrier and for each RX antenna of the gNB. Another example channel statistic is noise in the channel.

At block 940, the gNB 102 executes a fast classifier (such as a decision tree classifier) to select a codeword from the codebook stored in the memory 230 of the gNB. At block 950, the gNB 102 applies the selected codeword as convolution kernel for channel estimation.

FIGS. 10-14 illustrate examples of experimental test results from experiments conducted using simulated channels, in accordance with embodiments of this disclosure. In the experimental tests, the server 400 generated 128,000 noisy and corresponding noiseless samples of 816 subcarriers by 32 antennas from channel types TDL-A/B/C and UMI. The 5-fold cross validation was performed using the training set both to determine the codebook and train the decision tree as described above. For features, an estimation was performed that estimated the autocorrelation calculated as lags 0, 5, 10, 15, and 20, as well as an estimate of the noise variance for the noisy data.

Figure 11:
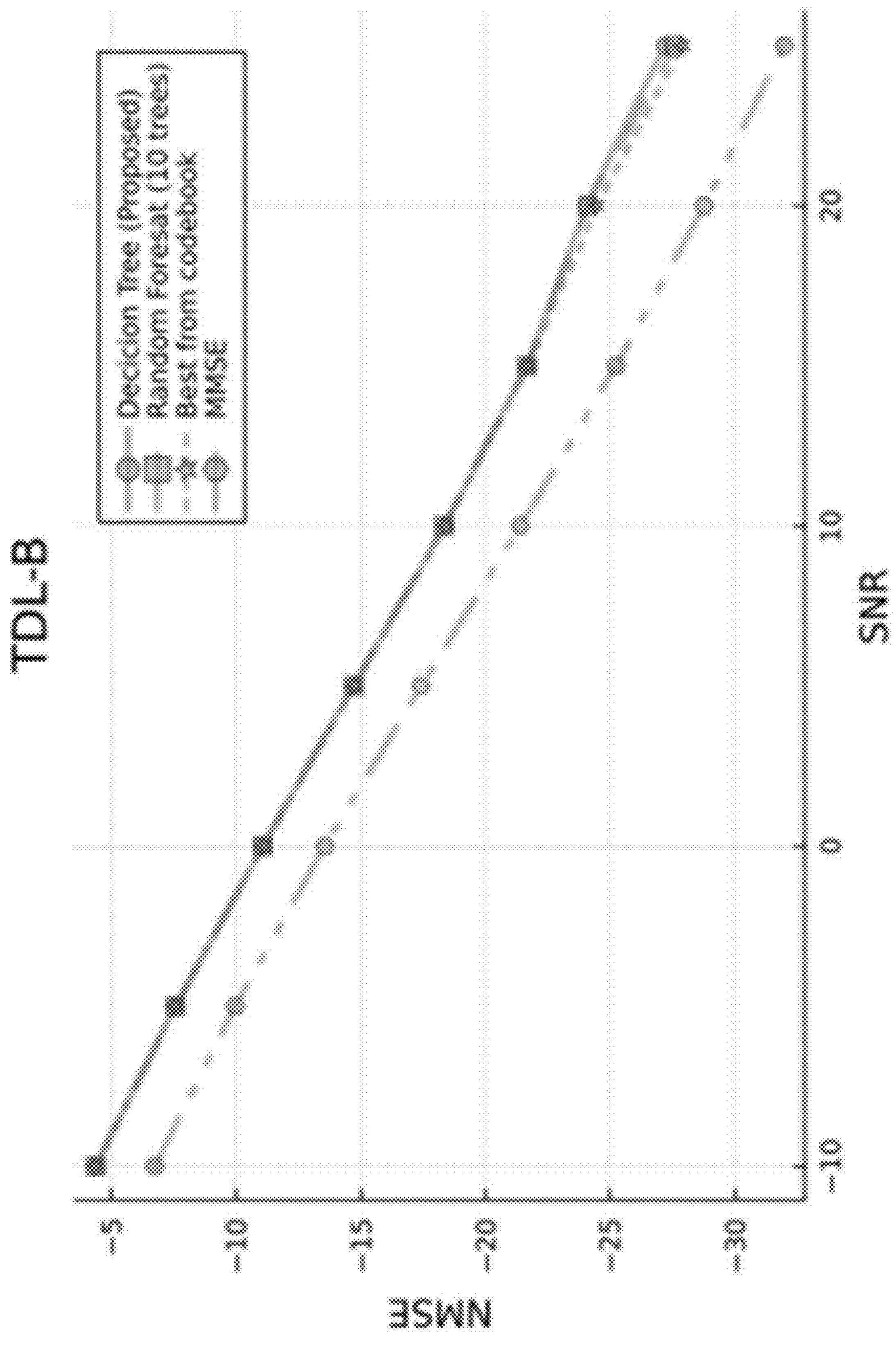
Figure 12:
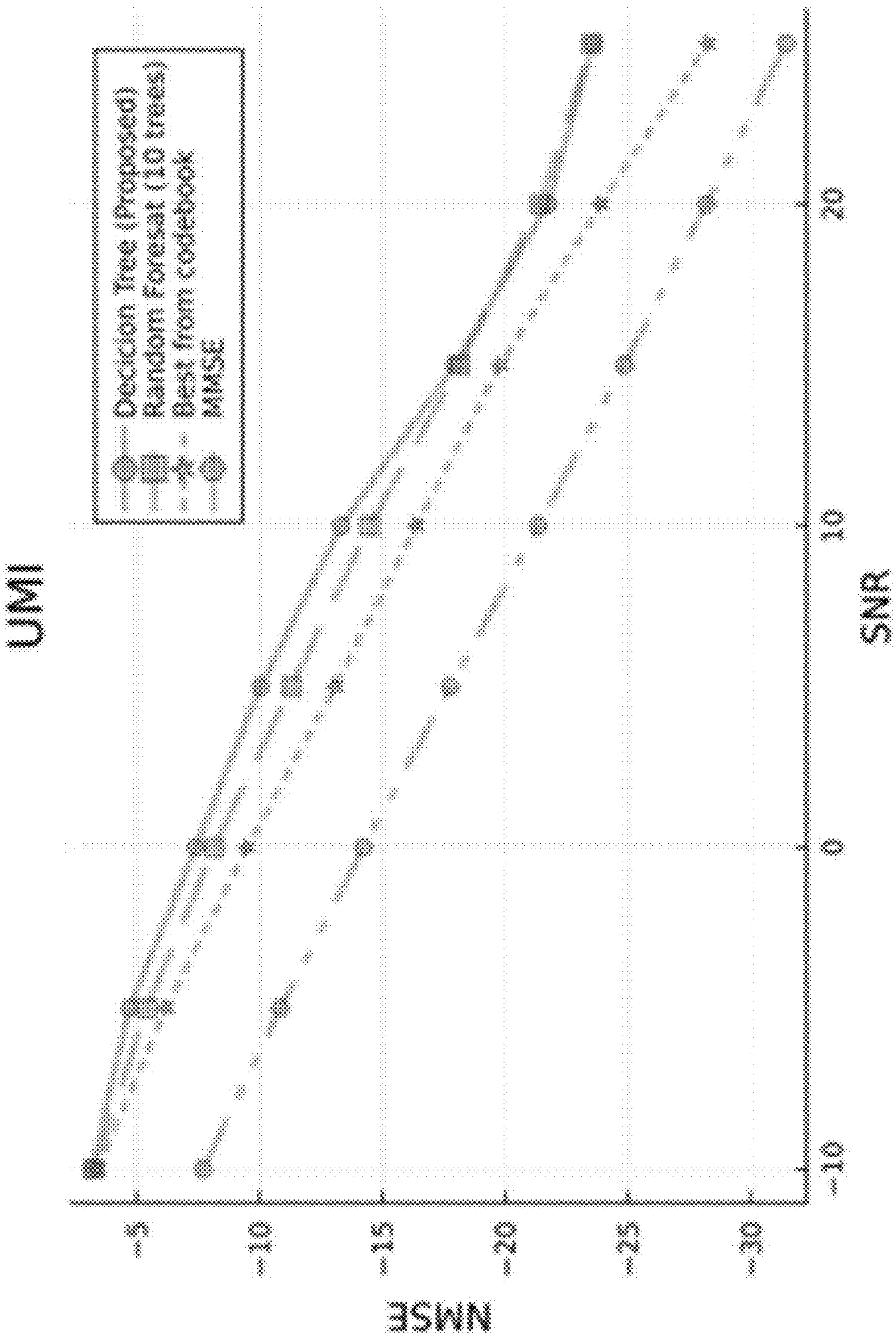

Various codebooks were tested during the experiments. For example, codebooks with 4, 6, 8, and 10 codewords were tested. However, FIGS. 10-14 only report the performance of the 10-codeword codebook. The performance of the artificial intelligence based (AI-based) Channel Estimation solution of this disclosure, with decision tree and random forest classifiers are reported in FIGS. 10-13. For a benchmark, the test used the MMSE filter from the noiseless channel calculated in the time domain under the assumption of tap gain independence (shown by hexagonal markers 1010). The experiment tracked the best representative codeword from the codebook (as shown using star markers 1020) to show the best that the fast classier achieved. The simple decision tree classifier 1040, in accordance with embodiments of this disclosure, performs well under these channel conditions. A 10-tree random forest 1030 offers little performance improvement despite the 10-fold increase in complexity. During the experiments, it was also observed that performance for TDL-B (shown in FIG. 11) and TDL-C (shown in FIG. 12) had a similar trend as the TDL-A (shown in FIG. 10), so a description of results for FIGS. 11-12 are not described herein.

Figure 13:
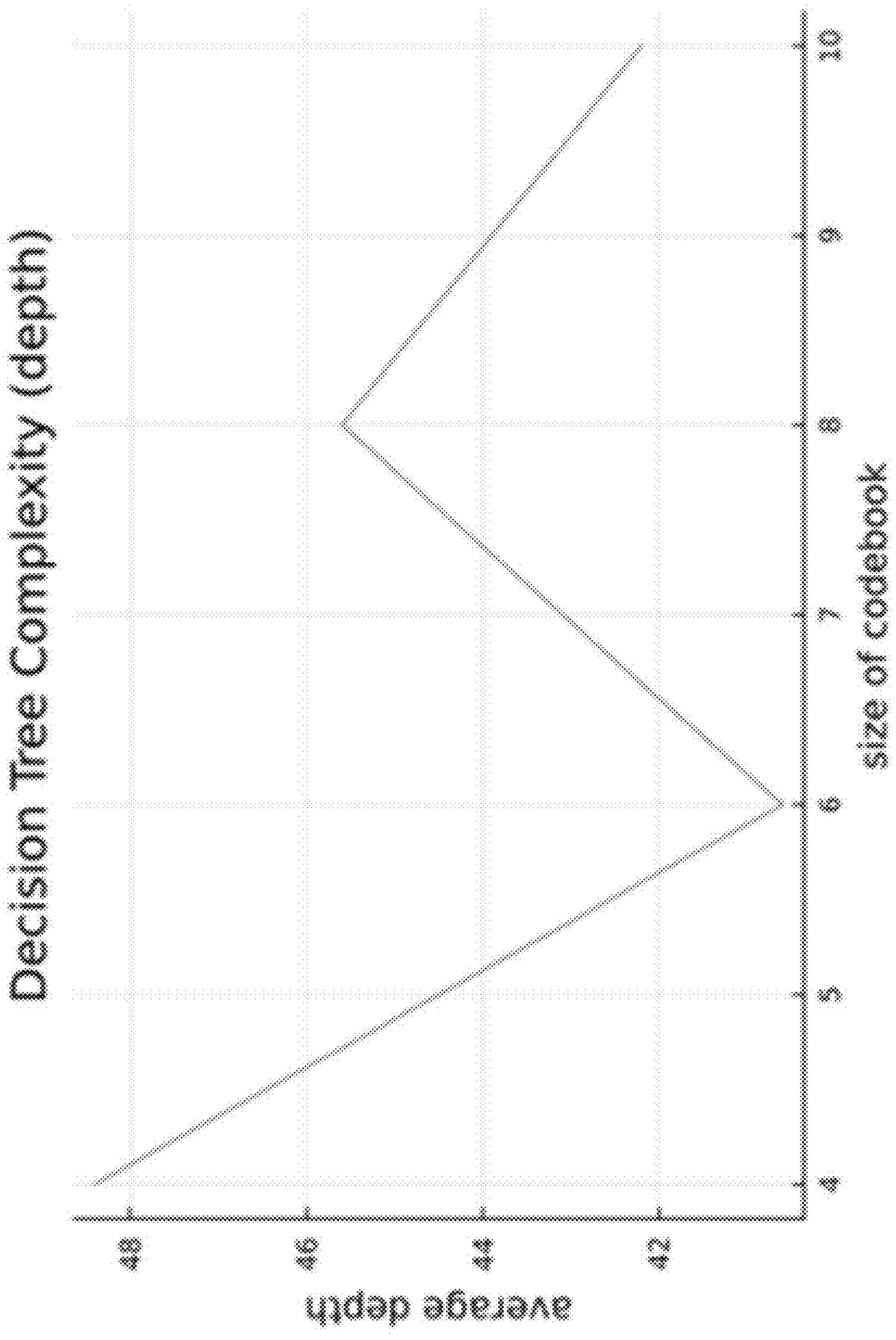
Figure 14:
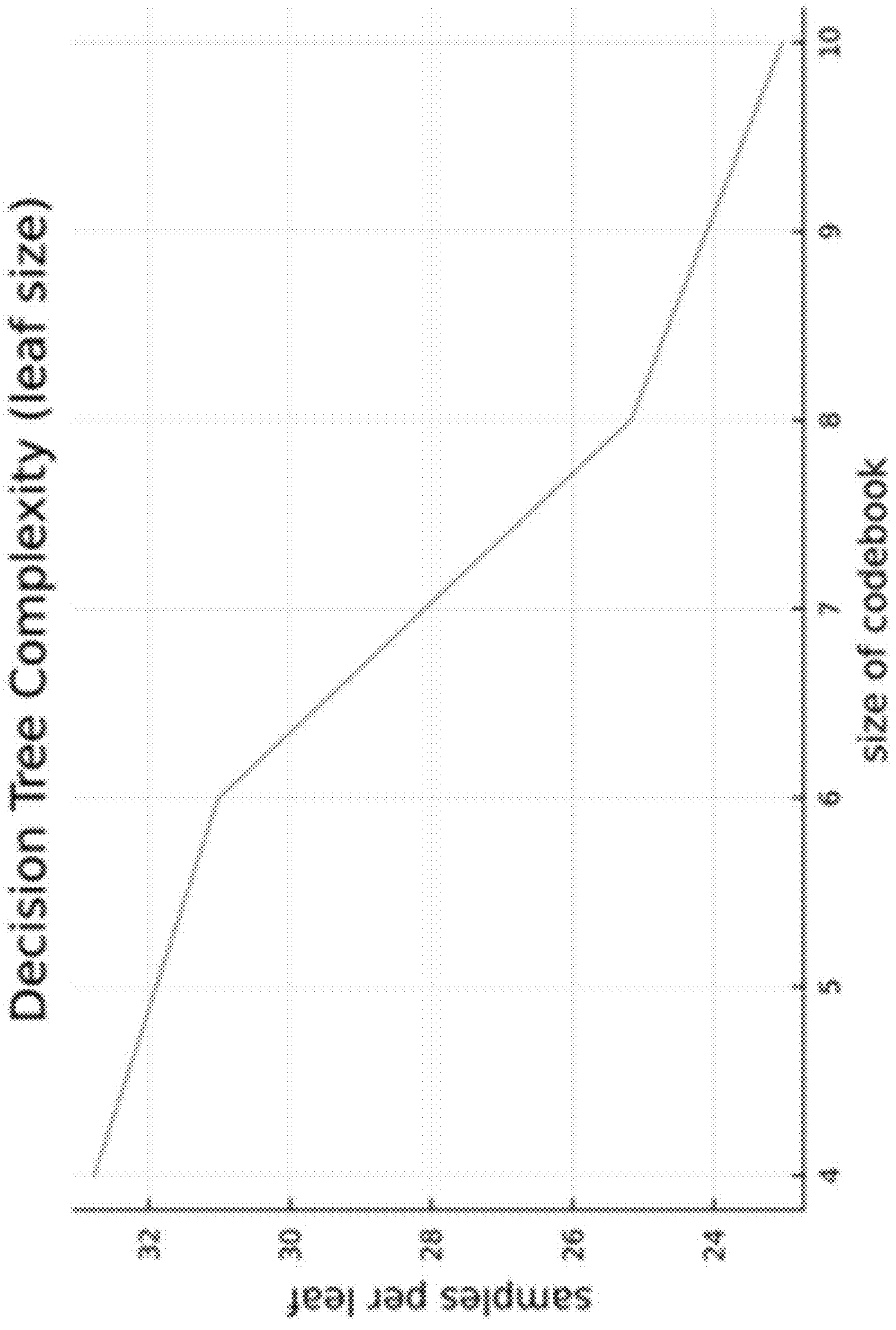

FIGS. 13 and 14 show computational complexity test results. The test results averaged over the cross validation folds both tree depth and number of training samples per leaf. It was observed that the larger codebooks offer low computational complexity. The small depth and low average number of samples per leaf for the larger codebooks indicates these trees are well balanced.

Figure 15:
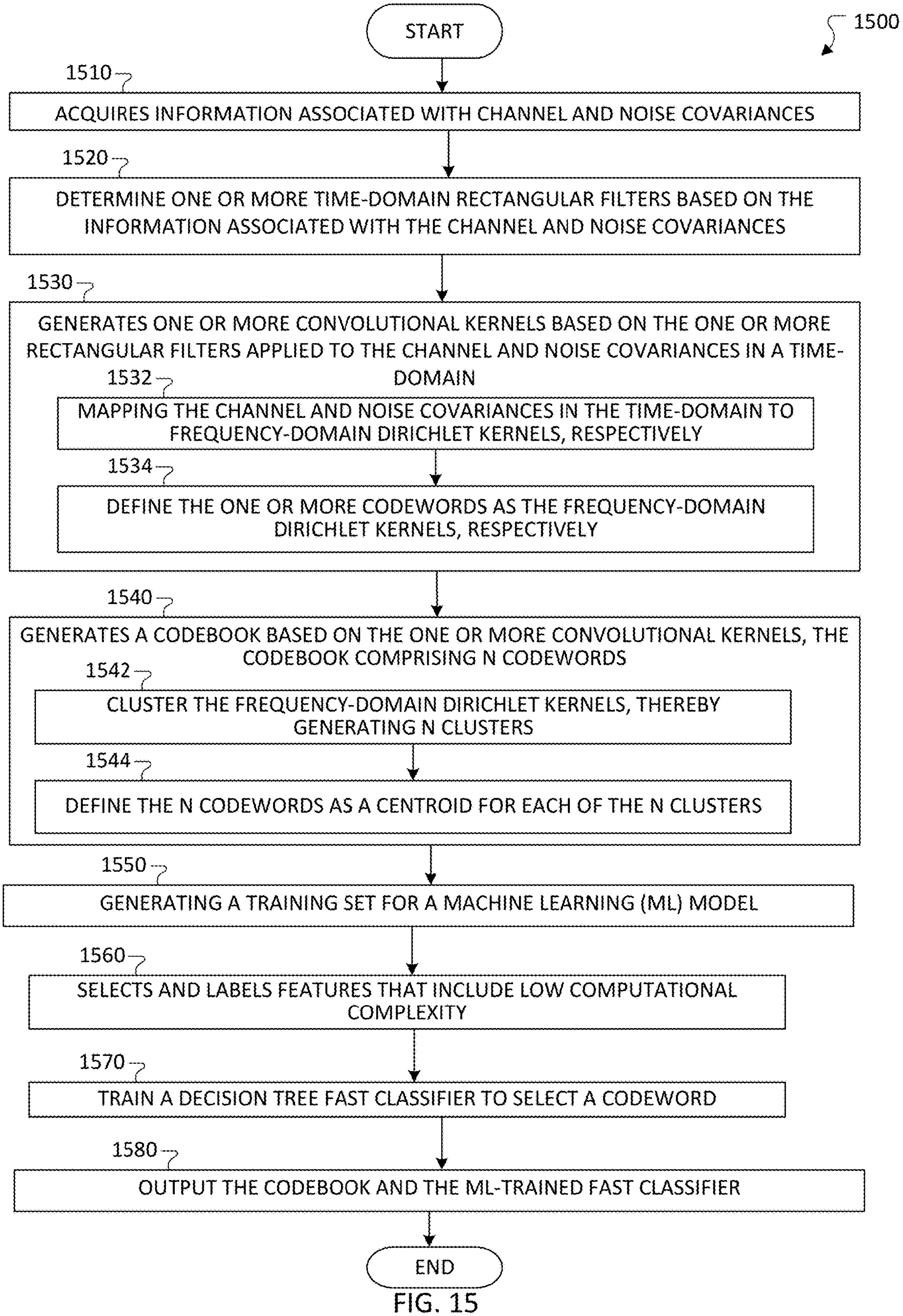
FIG. 15 illustrates a method for low complexity machine learning augmented robust channel estimation, in accordance with an embodiment of this disclosure.

FIG. 15 illustrates a method 1500 for low complexity machine learning augmented robust channel estimation, in accordance with an embodiment of this disclosure. The embodiment of the method 1500 shown in FIG. 15 is for illustration only, and other embodiments could be used without departing from the scope of this disclosure. The method 1500 is implemented by an electronic device, such as the server 400 of FIG. 4. More particularly, the method 1500 could be performed by a processor 410 of the sever 400. For ease of explanation, the method 1500 is described as being performed by the processor 410 in a case in which the electronic device is a server.

At block 1510, the processor 410 acquires information associated with channel and noise covariances. The procedure at block 1510 can be the same as or similar to the procedure at block 505 of FIG. 5. The information associated with channel and noise covariances includes a dataset of multiple samples associated with noiseless channels and corresponding noisy channels for various levels of signal-to-noise ratio (SNR). Each of the samples includes a noiseless channel and corresponding noisy channel.

At block 1520, the processor 410 determines one or more time-domain rectangular filters based on the information associated with the channel and noise covariances. The procedure at block 1520 can be the same as or similar to the procedure at block 540 of FIG. 5. In some embodiments, the one or more time-domain rectangular filters include a structure such that a single discrete Fourier Transform (DFT), when applied to time-domain covariance matrices, generates corresponding frequency-domain matrices.

At block 1530, the processor 410 generates one or more convolutional kernels based on the one or more rectangular filters applied to the channel and noise covariances in a time-domain. The procedure at block 1530 can be the same as or similar to the procedure at block 550 of FIG. 5.

In some embodiments, as shown at block 1532, the processor 410 can generate the one or more convolutional kernels by mapping the channel and noise covariances in the time-domain to frequency-domain Dirichlet kernels, respectively. At block 1534, the processor 410 defines the one or more codewords as the frequency-domain Dirichlet kernels, respectively.

At block 1540, the processor 410 generates a codebook based on the one or more convolutional kernels, the codebook comprising N codewords. The procedure at block 1540 can be the same as or similar to the procedure at block 570 of FIG. 5.

As shown at block 1542, the processor 410 generates the codebook by clustering the frequency-domain Dirichlet kernels, thereby generating N clusters. The procedure at block 1542 can be the same as or similar to the procedure at block 550 of FIG. 5. More particularly, at block 1544, the processor 410 defines the N codewords as a centroid for each of the N clusters.

At blocks 1550-1570, the processor 410 executes the method 800 (of FIG. 8) for calculating features and training decision tree classifier to selects a codeword for real-time channel estimation based on the trained decision tree classifier. At block 1550, the processor 410 generates a training set for a machine learning (ML) model that includes one or more symmetric Dirichlet kernels selected from among the frequency-domain Dirichlet kernels. The procedure at block 1550 can be the same as or similar to the procedure at block 810 of FIG. 8.

At block 1560, the processor 410 selects and labels features that include low computational complexity. The procedure at block 1560 can be the same as or similar to the procedure at block 820 of FIG. 8. The low computational complexity includes at least one of: a noise variance less than a noise variance threshold; or a channel AFC at fewer than a threshold number of lags.

At block 1570, the processor 410 trains a decision tree fast classifier to select a codeword by only checking inequalities on coordinates and checking a threshold number of arithmetic operations at a selected leaf of the decision tree. The procedure at block 1570 can be the same as or similar to the procedure at block 830 of FIG. 8.

At block 1580, the processor 410 outputs the codebook and the ML-trained fast classifier. For example, communication circuitry 420 of the server 400 establishes a communication link to the gNB 102, for example, via the backhaul/network IF 235. In some embodiments, the server 400 makes the codebook and the ML-trained fast classifier accessible to the gNB 102, so that the gNB 102 downloads them into the memory 230 of the gNB. In some embodiments, the communication circuitry 420 of the server 400 sends the codebook and the ML-trained fast classifier to the gNB 102.

Although FIG. 15 illustrates an example a method 1500 for low complexity machine learning augmented robust channel estimation various changes may be made to FIG. 15. For example, while shown as a series of steps, various steps in FIG. 15 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
acquiring, by a processor of an electronic device, information associated with channel and noise covariances;
determining one or more time-domain rectangular filters based on the information associated with the channel and noise covariances;
generating one or more convolutional kernels based on the one or more rectangular filters applied to the channel and noise covariances in a time-domain; and
generating a codebook based on the one or more convolutional kernels, the codebook comprising N codewords, N is a non-zero positive integer.

2. The method of claim 1, further comprising:
generating one or more convolutional kernels further by mapping the channel and noise covariances in the time-domain to frequency-domain Dirichlet kernels, respectively; and
defining the N codewords as the frequency-domain Dirichlet kernels, respectively.

3. The method of claim 2, further comprising:
clustering the frequency-domain Dirichlet kernels, thereby generating N clusters; and
defining the N codewords as a centroid for each of the N clusters.

4. The method of claim 2, further comprising:
generating a training set for a machine learning (ML) model that includes one or more symmetric Dirichlet kernels selected from among the frequency-domain Dirichlet kernels;
selecting and labeling features that include low computational complexity, wherein low computational complexity includes at least one of:
a noise variance less than a noise variance threshold, or
a channel autocorrelation function at fewer than a threshold number of lags; and
training a decision tree classifier to select a codeword by only checking inequalities on coordinates and checking a threshold number of arithmetic operations at a selected leaf of the decision tree classifier.

5. The method of claim 1, wherein the one or more time-domain rectangular filters include a structure such that a single discrete Fourier Transform (DFT), when applied to time-domain covariance matrices, generates corresponding frequency-domain matrices.

6. The method of claim 1, wherein the information associated with channel and noise covariances comprises:
a dataset of multiple samples associated with noiseless channels and corresponding noisy channels for various levels of signal-to-noise ratio (SNR); and
each of the samples includes a noiseless channel and corresponding noisy channel.

7. The method of claim 1, further comprising:
establishing, by communication circuitry of the electronic device, a communication link to a base station;
receiving, by the base station from the electronic device, the codebook comprising N codewords;
calculating, by the base station, channel statistics using a low complexity algorithm;
executing, by the base station, a decision tree classifier to select a codeword from the codebook stored in a memory; and
applying, by the base station, the selected codeword as convolution kernel for channel estimation.

8. An electronic device comprising:
a processor configured to:
acquire information associated with channel and noise covariances;
determine one or more time-domain rectangular filters based on the information associated with the channel and noise covariances;
generate one or more convolutional kernels based on the one or more rectangular filters applied to the channel and noise covariances in a time-domain; and
generate a codebook based on the one or more convolutional kernels, the codebook comprising N codewords, N is a non-zero positive integer.

9. The electronic device of claim 8, wherein:
to generate one or more convolutional kernels, the processor is further configured to map the channel and noise covariances in the time-domain to frequency-domain Dirichlet kernels, respectively; and
define the N codewords as the frequency-domain Dirichlet kernels, respectively.

10. The electronic device of claim 9, wherein the processor is further configured to:

cluster the frequency-domain Dirichlet kernels, thereby generating N clusters; and define the N codewords as a centroid for each of the N clusters.

11. The electronic device of claim 9, wherein the processor is further configured to:

generate a training set for a machine learning (ML) model that includes one or more symmetric Dirichlet kernels selected from among the frequency-domain Dirichlet kernels;

select and label features that include low computational complexity, wherein low computational complexity includes at least one of:

a noise variance less than a noise variance threshold, or a channel autocorrelation function at fewer than a threshold number of lags; and train a decision tree classifier to select a codeword by only checking inequalities on coordinates and checking a threshold number of arithmetic operations at a selected leaf of the decision tree classifier.

12. The electronic device of claim 8, wherein the one or more time-domain rectangular filters include a structure such that a single discrete Fourier Transform (DFT), when applied to time-domain covariance matrices, generates corresponding frequency-domain matrices.

13. The electronic device of claim 8, wherein the information associated with channel and noise covariances comprises:

a dataset of multiple samples associated with noiseless channels and corresponding noisy channels for various levels of signal-to-noise ratio (SNR); and each of the samples includes a noiseless channel and corresponding noisy channel.

14. A system comprising:

the electronic device of claim 8; and a base station operably coupled to the electronic device, the base station comprising:

a transceiver configured to receive a reference signal from a user equipment (UE);

a memory; and at least one processor configured to:

receive, from the electronic device, the codebook comprising N codewords;

calculate channel statistics using a low complexity algorithm;

execute a decision tree classifier to select a codeword from the codebook stored in the memory; and apply the selected codeword as convolution kernel for channel estimation.

15. A non-transitory computer readable medium embodying a computer program, the computer program comprising computer readable program code that, when executed by a processor of an electronic device, causes the processor to:

acquire information associated with channel and noise covariances;

determine one or more time-domain rectangular filters based on the information associated with the channel and noise covariances;

generate one or more convolutional kernels based on the one or more rectangular filters applied to the channel and noise covariances in a time-domain; and generate a codebook based on the one or more convolutional kernels, the codebook comprising N codewords, N is a non-zero positive integer.

16. The non-transitory computer readable medium of claim 15, wherein the program code that, when executed by the processor, causes the processor to generate one or more convolutional kernels further comprises program code that when executed causes the processor to:

map the channel and noise covariances in the time-domain to frequency-domain Dirichlet kernels, respectively; and further containing program code that, when executed by the processor, causes the processor to:

define the N codewords as the frequency-domain Dirichlet kernels, respectively.

17. The non-transitory computer readable medium of claim 16, further containing program code that, when executed by the processor, causes the processor to:

cluster the frequency-domain Dirichlet kernels, thereby generating N clusters; and define the N codewords as a centroid for each of the N clusters.

18. The non-transitory computer readable medium of claim 16, further containing program code that, when executed by the processor, causes the processor to:

generate a training set for a machine learning (ML) model that includes one or more symmetric Dirichlet kernels selected from among the frequency-domain Dirichlet kernels;

select and label features that include low computational complexity, wherein low computational complexity includes at least one of:

a noise variance less than a noise variance threshold, or a channel autocorrelation function at fewer than a threshold number of lags; and train a decision tree classifier to select a codeword by only checking inequalities on coordinates and checking a threshold number of arithmetic operations at a selected leaf of the decision tree classifier.

19. The non-transitory computer readable medium of claim 15, wherein the one or more time-domain rectangular filters include a structure such that a single discrete Fourier Transform (DFT), when applied to time-domain covariance matrices, generates corresponding frequency-domain matrices.

20. The non-transitory computer readable medium of claim 15, wherein the information associated with channel and noise covariances comprises:

a dataset of multiple samples associated with noiseless channels and corresponding noisy channels for various levels of signal-to-noise ratio (SNR); and each of the samples includes a noiseless channel and corresponding noisy channel.

* * * * *